United States Patent
Bui et al.

(10) Patent No.: US 12,236,975 B2
(45) Date of Patent: *Feb. 25, 2025

(54) BI-DIRECTIONAL RECURRENT ENCODERS WITH MULTI-HOP ATTENTION FOR SPEECH EMOTION RECOGNITION

(71) Applicant: Adobe Inc., San Jose, CA (US)

(72) Inventors: Trung Bui, San Jose, CA (US); Subhadeep Dey, Martigny (CH); Seunghyun Yoon, Seoul (KR)

(73) Assignee: Adobe Inc., San Jose, CA (US)

( * ) Notice: Subject to any disclaimer, the term of this patent is extended or adjusted under 35 U.S.C. 154(b) by 749 days.

This patent is subject to a terminal disclaimer.

(21) Appl. No.: 17/526,810

(22) Filed: Nov. 15, 2021

(65) Prior Publication Data

US 2022/0076693 A1 Mar. 10, 2022

Related U.S. Application Data

(63) Continuation of application No. 16/543,342, filed on Aug. 16, 2019, now Pat. No. 11,205,444.

(51) Int. Cl.
*G10L 25/00* (2013.01)
*G06F 17/16* (2006.01)
(Continued)

(52) U.S. Cl.
CPC .............. *G10L 25/63* (2013.01); *G06F 17/16* (2013.01); *G06F 17/18* (2013.01); *G06N 3/047* (2023.01); *G10L 25/30* (2013.01)

(58) Field of Classification Search
CPC .... G06N 3/0454; G06N 3/0445; G06N 7/005; G06N 3/04; G06N 3/0481; G06N 3/02;
(Continued)

(56) References Cited

U.S. PATENT DOCUMENTS 9,984,682 B1   5/2018  Tao et al.
11,205,444 B2 * 12/2021  Bui ........................ G06N 3/044
(Continued)

OTHER PUBLICATIONS

S. Yoon, S. Byun, S. Dey and K. Jung, "Speech Emotion Recognition Using Multi-hop Attention Mechanism," ICASSP 2019—2019 IEEE International Conference on Acoustics, Speech and Signal Processing (ICASSP), Brighton, UK, 2019, pp. 2822-2826 (Year: 2019).*

(Continued)

*Primary Examiner* — Edgar X Guerra-Erazo
(74) *Attorney, Agent, or Firm* — Keller Preece PLLC

(57) ABSTRACT

The present disclosure relates to systems, methods, and non-transitory computer readable media for determining speech emotion. In particular, a speech emotion recognition system generates an audio feature vector and a textual feature vector for a sequence of words. Further, the speech emotion recognition system utilizes a neural attention mechanism that intelligently blends together the audio feature vector and the textual feature vector to generate attention output. Using the attention output, which includes consideration of both audio and text modalities for speech corresponding to the sequence of words, the speech emotion recognition system can apply attention methods to one of the feature vectors to generate a hidden feature vector. Based on the hidden feature vector, the speech emotion recognition system can generate a speech emotion probability distribution of emotions among a group of candidate emotions, and then select one of the candidate emotions as corresponding to the sequence of words.

20 Claims, 11 Drawing Sheets

(51) Int. Cl.
  *G06F 17/18* (2006.01)
  *G06N 3/047* (2023.01)
  *G10L 25/30* (2013.01)
  *G10L 25/63* (2013.01)

(58) Field of Classification Search
  CPC ..... G06N 3/0472; G10L 15/01; G10L 15/083;
      G10L 15/14; G10L 15/16; G10L 15/20;
      G10L 2015/221; G10L 15/222; G10L
      2015/223; G10L 15/26; G10L 17/18;
      G10L 17/20; G10L 25/63; G10L 25/30;
      G06F 17/18; G06F 17/16
  See application file for complete search history.

(56) References Cited

U.S. PATENT DOCUMENTS

2019/0341025 A1  11/2019  Omote et al.
2019/0371298 A1  12/2019  Hannun et al.

OTHER PUBLICATIONS

Kurpukdee, Nattapong, et al. "Speech emotion recognition using convolutional long short-term memory neural network and support vector machines." 2017 Asia-Pacific Signal and Information Processing Association Annual Summit and Conference (APSIPA ASC). IEEE, 2017. (Year: 2017).*

Sun, Licai, et al. "Multimodal cross-and self-attention network for speech emotion recognition." ICASSP 2021-2021 IEEE International Conference on Acoustics, Speech and Signal Processing (ICASSP). IEEE, 2021. (Year: 2021).*

Rosalind W Picard, "Affective computing: challenges," International Journal of Human-Computer Studies, vol. 59, No. 1-2, pp. 55-64, 2003.

Carlos Busso, Murtaza Bulut, Shrikanth Narayanan, J Gratch, and S Marsella, "Toward effective automatic recognition systems of emotion in speech," Social emotions in nature and artifact: emotions in human and human-computer interaction, J. Gratch and S. Marsella, Eds, pp. 110-127, 2013.

Agata Kołakowska, Agnieszka Landowska, Mariusz Szwoch, Wioleta Szwoch, and Michal R Wrobel, "Emotion recognition and its applications," in Human-Computer Systems Inter-action: Backgrounds and Applications 3, pp. 51-62. Springer, 2014.

Kun Han, Dong Yu, and Ivan Tashev, "Speech emotion recognition using deep neural network and extreme learning machine," in Fifteenth annual conference of the international speech communication association, 2014.

Bjorn Schuller, Gerhard Rigoll, and Manfred Lang, "Speech emotion recognition combining acoustic features and linguistic information in a hybrid support vector machine-belief network architecture," in Acoustics, Speech, and Signal Processing (ICASSP), IEEE International Conference on. IEEE, 2004, pp. I-577.

Qin Jin, Chengxin Li, Shizhe Chen, and Huimin Wu, "Speech emotion recognition with acoustic and lexical features," in Acoustics, Speech and Signal Processing (ICASSP), 2015 IEEE International Conference on. IEEE, 2015, pp. 4749-4753.

Seunghyun Yoon, Seokhyun Byun, and Kyomin Jung, "Multimodal speech emotion recognition using audio and text," arXiv preprint arXiv:1810.04635, 2018.

Carlos Busso, Murtaza Bulut, Chi-Chun Lee, Abe Kazemzadeh, Emily Mower, Samuel Kim, Jeannette N Chang, Sungbok Lee, and Shrikanth S Narayanan, "Iemocap: Interactive emotional dyadic motion capture database," Language resources and evaluation, vol. 42, No. 4, pp. 335, 2008.

Thapanee Seehapoch and Sartra Wongthanavasu, "Speech emotion recognition using support vector machines," in Knowledge and Smart Technology (KST), 2013 5th International Conference on. IEEE, 2013, pp. 86-91.

Bjorn Schuller, Gerhard Rigoll, and Manfred Lang, "Hidden markov model-based speech emotion recognition," in Multi-media and Expo, 2003. ICME'03. Proceedings. 2003 International Conference on. IEEE, 2003, vol. 1, pp. I-401.

Chi-Chun Lee, Emily Mower, Carlos Busso, Sungbok Lee, and Shrikanth Narayanan, "Emotion recognition using a hierarchical binary decision tree approach," Speech Communication, vol. 53, No. 9-10, pp. 1162-1171, 2011.

Dario Bertero and Pascale Fung, "A first look into a convolutional neural network for speech emotion detection," in Acoustics, Speech and Signal Processing (ICASSP), 2017 IEEE International Conference on. IEEE, 2017, pp. 5115-5119.

Abdul Malik Badshah, Jamil Ahmad, Nasir Rahim, and Sung Wook Baik, "Speech emotion recognition from spectrograms with deep convolutional neural network," in Platform Technology and Service (PlatCon), 2017 International Conference on. IEEE, 2017, pp. 1-5.

Zakaria Aldeneh and Emily Mower Provost, "Using regional saliency for speech emotion recognition," in Acoustics, Speech and Signal Processing (ICASSP), 2017 IEEE International Conference on. IEEE, 2017, pp. 2741-2745.

Aharon Satt, Shai Rozenberg, and Ron Hoory, "Efficient emotion recognition from speech using deep learning on spectrograms," Proc. Interspeech 2017, pp. 1089-1093, 2017.

Pengcheng Li, Yan Song, Ian McLoughlin, Wu Guo, and Lirong Dai, "An attention pooling based representation learning method for speech emotion recognition," Proc. Interspeech 2018, pp. 3087-3091, 2018.

Seyedmahdad Mirsamadi, Emad Barsoum, and Cha Zhang, "Automatic speech emotion recognition using recurrent neural networks with local attention," in Acoustics, Speech and Signal Processing (ICASSP), 2017 IEEE International Conference on. IEEE, 2017, pp. 2227-2231.

Jaejin Cho, Raghavendra Pappagari, Purva Kulkarni, Jesus Villalba, Yishay Carmiel, and Najim Dehak, "Deep neural networks for emotion recognition combining audio and transcripts," Proc. Interspeech 2018, pp. 247-251, 2018.

Yun Wang, Leonardo Neves, and Florian Metze, "Audio-based multimedia event detection using deep recurrent neural networks," in Acoustics, Speech and Signal Processing (ICASSP), 2016 IEEE International Conference on. IEEE, 2016, pp. 2742-2746.

Yiren Wang and Fei Tian, "Recurrent residual learning for sequence classification," in Proceedings of the 2016 Conference on Empirical Methods in Natural Language Processing, 2016, pp. 938-943.

Samarth Tripathi and Homayoon Beigi, "Multi-modale motion recognition on iemocap dataset using deep learning," arXiv preprint arXiv:1804.05788, 2018.

Daniel Povey, Arnab Ghoshal, Gilles Boulianne, Lukas Burget, Ondrej Glembek, Nagendra Goel, Mirko Hannemann, Petr Motlicek, Yanmin Qian, Petr Schwarz, et al., "The kaldi speech recognition toolkit," Tech. Rep., IEEE Signal Processing Society, 2011.

Florian Eyben, Felix Weninger, Florian Gross, and Bjorn Schuller, "Recent developments in opensmile, the munich open-source multimedia feature extractor," in Proceedings of the 21st ACM international conference on Multimedia. ACM, 2013, pp. 835-838.

Google, "Cloud speech-to-text," http://cloud.google.com/speech-to-text/, 2018.

Michael Neumann and Ngoc Thang Vu, "Attentive convolutional neural network based speech emotion recognition: A study on the impact of input features, signal length, and acted speech," Proc. Interspeech 2017, pp. 1263-1267, 2017.

Diederik Kingma and Jimmy Ba, "Adam: A method for stochastic optimization," arXiv preprint arXiv:1412.6980, 2014.

Lee, J. & Tashev, I. High-level feature representation using recurrent neural network for speech emotion recognition. In Sixteenth Annual Conference of the International Speech Communication Association (2015).

Lorenzo-Trueba, J., Henter, G. E., Takaki, S., Yamagishi, J., Morino, Y., & Ochiai, Y. (2018). Investigating different representations for modeling and controlling multiple emotions in DNN-based speech synthesis. Speech Communication, 99, 135-143. (Year: 2018 (Year: 2018).

(56) References Cited

OTHER PUBLICATIONS

U.S. Appl. No. 16/543,342, Apr. 15, 2021, Office Action.
U.S. Appl. No. 16/543,342, Aug. 13, 2021, Notice of Allowance.

* cited by examiner

| Model | Modality | WA | UA |
|---|---|---|---|
| \multicolumn{4}{c}{Ground-truth transcript} | | | |
| DNN-ELM | A | 0.459 | 0.448 |
| RNN(prop.)-ELM | A | 0.628 | - |
| 3CNN-LSTM10H | A | 0.688 | - |
| CNN-attn | A | 0.561 | - |
| RNN-attention | A | 0.635 | 0.588 |
| E_vec-MCNN-LSTM | A+T | 0.649 | 0.659 |
| MDRE[4] | A+T | 0.718 | - |
| audio-BRE | A | 0.646 | 0.652 |
| text-BRE | T | 0.698 | 0.703 |
| MHA-1 | A+T | 0.756 | 0.765 |
| MHA-2 | A+T | 0.765 | 0.776 |
| MHA-3 | A+T | 0.740 | 0.753 |
| \multicolumn{4}{c}{ASR-processed transcript} | | | |
| text-BRE-ASR | T | 0.652 | 0.658 |
| MHA-2-ASR | A+T | 0.730 | 0.739 |

*Fig. 5*

BI-DIRECTIONAL RECURRENT ENCODERS WITH MULTI-HOP ATTENTION FOR SPEECH EMOTION RECOGNITION

CROSS-REFERENCE TO RELATED APPLICATIONS

The present application is a continuation of U.S. application Ser. No. 16/543,342, filed on Aug. 16, 2019. The aforementioned application is hereby incorporated by reference in its entirety.

BACKGROUND

Recent years have seen significant advancements in hardware and software platforms for human-computer interaction (HCI). For example, recent HCI systems now allow users to interact with computing systems using voice as input. For such voice-based HCI systems to function properly, they must be able to properly analyze and process voice input from a user. Unfortunately, a number of problems exist with conventional voice-based HCI systems that lead to incorrect, inaccurate, or inflexible voice processing.

SUMMARY

Aspects of the present disclosure can include computer-readable media, and systems that intelligently blend acoustic data and textual data of speech to accurately predict an emotion corresponding to the speech. For example, in one or more embodiments, the disclosed systems can use an attention mechanism to exploit both textual and acoustic information in tandem to determine emotion. In particular, the disclosed systems can use a neural attention mechanism to select relevant parts of the speech (e.g., relevant textual data) as context for analyzing corresponding audio data and vice versa. In so doing, the disclosed systems can exploit both textual and acoustic modalities to more accurately predict an emotion classification for the speech.

To illustrate, in some embodiments, the disclosed systems can use one or more bi-directional encoders to encode audio data and textual data corresponding to the speech. Further, the disclosed systems can use the neural attention mechanism mentioned above to automatically infer a correlation between the audio and textual modalities. For example, the neural attention mechanism can determine relevant segments of the textual data corresponding to the audio signal. The disclosed systems can then apply the relevant textual data to parts of the audio signal and generate an attention output. Additionally, the disclosed system can generate a hidden representation (e.g., a hidden state) based on the attention output. The disclosed systems can then use the hidden representation to predict an emotion of the speech at each state.

Additional features and advantages of one or more embodiments of the present disclosure are outlined in the description which follows.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 5 illustrates a table reflecting experimental results regarding the effectiveness of the speech emotion recognition system in accordance with one or more embodiments;

DETAILED DESCRIPTION

Figure 1:
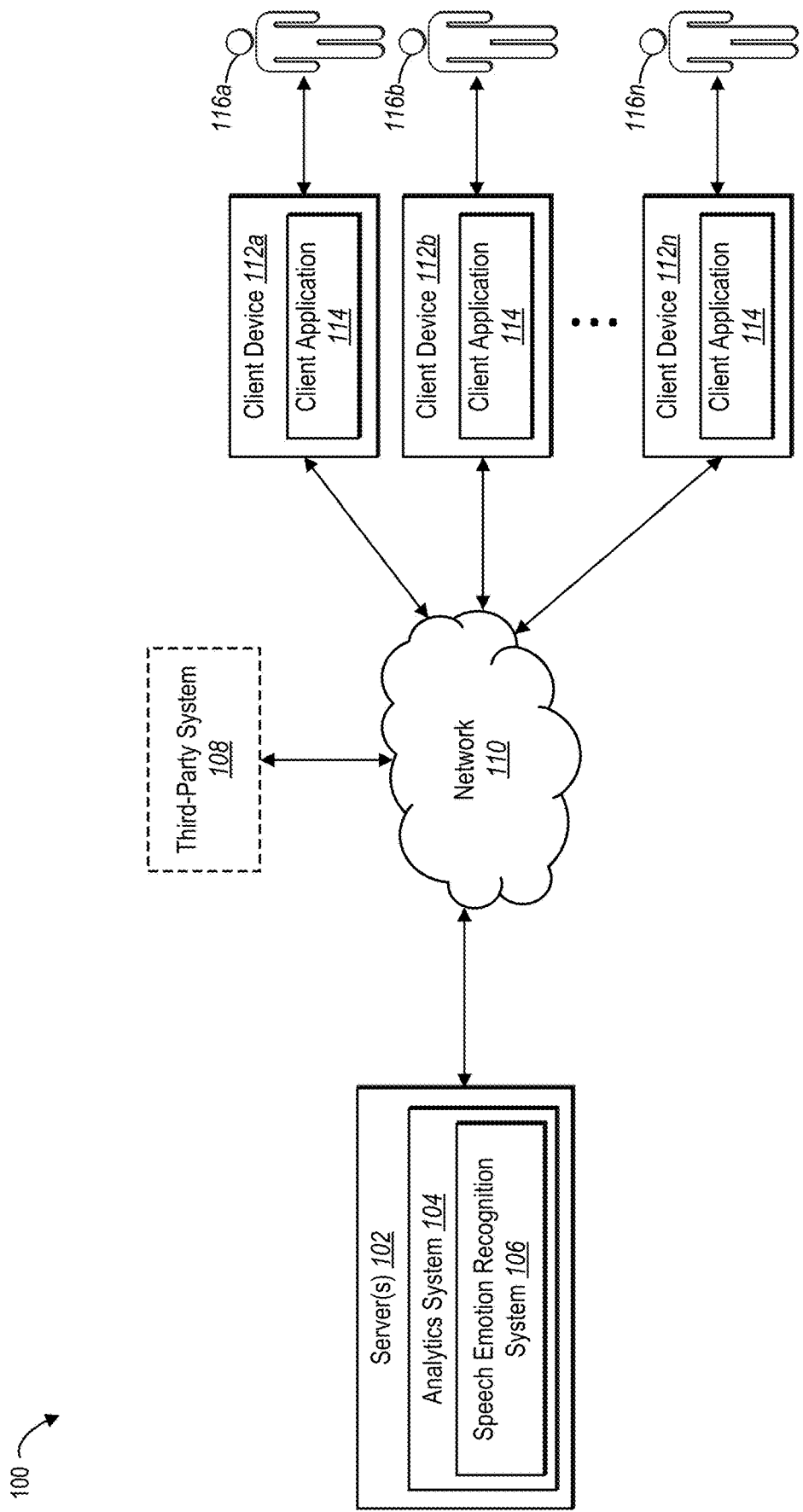
FIG. 1 illustrates an example environment in which a speech emotion recognition system can operate in accordance with one or more embodiments.

One or more embodiments described herein include a speech emotion recognition system that utilizes a neural network architecture that intelligently blends textual data and acoustic data to predict speech emotion. For example, in one or more embodiments, the speech emotion recognition system can use architecture of a bi-directional recurrent encoder (sometimes hereafter "BRE") and a multi-hop neural attention model (sometimes hereafter "MHA") to obtain information from each modality (e.g., voice and text) by extracting relevant segments of voice data using information from textual content and vice-versa. In this manner, the speech emotion recognition system can generate more informative vector representations of the audio data and text data to, in turn, generate more accurate emotion classifications compared to conventional systems.

To illustrate, in some embodiments, the speech emotion recognition system can generate one or more feature vectors to predict speech emotion. For example, the speech emotion recognition system can generate, using an audio bi-directional recurrent encoder, an audio feature vector that includes a representation of audio data feature information corresponding to speech (e.g., one or more uttered words in an acoustic sequence). Additionally, the speech emotion recognition system can generate, using a text bi-directional recurrent encoder, a textual feature vector that includes a representation of textual data feature information corresponding to the one or more words in the textual sequence. Further, the speech emotion recognition system can then create a neural attention output by combining together, at each state (e.g., timestep corresponding to the processing of a particular word), one or more portions of the textual feature vector and the audio feature vector. In this manner, one feature vector can provide context to the other feature vector such that the speech emotion recognition system can exploit information from each modality in the attention output. Further, the speech emotion recognition system can modify one of the feature vectors according to the attention output to generate a hidden feature vector. Based on the hidden feature vector, the speech emotion recognition system can generate a probability distribution of candidate emotions and therefrom determine an emotion that corresponds to the speech.

As just mentioned, in some embodiments, the speech emotion recognition system can utilize a neural network (e.g., a speech emotion recognition neural network) having one or more bi-directional recurrent encoders. For example, the speech emotion recognition system can include an audio bi-directional recurrent encoder and a text bi-directional recurrent encoder. For a given audio bi-directional recurrent encoder, the speech emotion recognition system can utilize a forward recurrent neural network layer to generate forward states corresponding to audio signals from the audio of a sequence of words and a backward recurrent neural network layer to generate backward states corresponding to audio of the words. The speech emotion recognition neural network can then combine the forward states and backward states corresponding to the given states to generate the audio feature vector using the audio bi-directional recurrent encoder. Similarly, for the text bi-directional recurrent encoder, the speech emotion recognition system can utilize a forward recurrent neural network layer to generate forward states corresponding to text of the sequence of words and a backward recurrent neural network layer to generate backward states corresponding to text of the words. The speech emotion recognition neural network can then combine the forward states and backward states corresponding to the given states to generate the textual feature vector using the text bi-directional recurrent encoder.

As further mentioned above, in some embodiments, the speech emotion recognition system includes one or more neural attention mechanisms for generating attention output at each state of a textual sequence. To illustrate, in some embodiments, the speech emotion recognition system includes a neural attention mechanism at each hop or layer within the multi-hop neural attention model. At each hop in the multi-hop neural attention model, the speech emotion recognition system can update the neural attention mechanism with different inputs to generate a new attention output. In some embodiments, the different inputs to the neural attention mechanism can alternate from hop to hop. For example, in first hop, the speech emotion recognition system can provide the textual feature vector as an input to the neural attention mechanism. Then alternating feature vectors at a second hop, the speech emotion recognition system can provide the audio feature vector as an input to the neural attention mechanism. Accordingly, at a third hop, the speech emotion recognition system can provide the textual feature vector as an input to the neural attention mechanism, and so forth in an alternating fashion. Additionally, inputs to the neural attention mechanism can generate a hidden feature vector (described further below) from a previous hop. Based on the various inputs to the neural attention mechanism, the speech emotion recognition system can generate an attention output at each state of the textual sequence.

With each new attention output, the speech emotion recognition system can, in turn, generate a new hidden feature vector for each hop. For example, at a first hop, the speech emotion recognition system can generate a first hidden feature vector by modifying one of the feature vectors (e.g., the textual feature vector or the audio feature vector) according to a first attention output. Then, at a second hop, the speech emotion recognition system can generate a second hidden feature vector by modifying another one of the feature vectors according to a second attention output. In these or other embodiments, each hidden feature vector can represent a final hidden representation corresponding to a respective hop of the multi-hop neural attention model in which the final hidden representation includes information for both textual and audio modalities of the speech.

As further mentioned above, the speech emotion recognition system can determine the emotion classification of the speech using the hidden feature vector. For example, the speech emotion recognition system can use a probability function to determine the probability that the speech corresponds to a particular emotion or category of emotions based on the hidden feature vector. For instance, the speech emotion recognition system can determine a probability distribution among a group of candidate emotions (e.g., happy, sad, neutral, angry, etc.) corresponding to the speech. In some embodiments, the speech emotion recognition system can determine the probability distribution at each hop and thereby update and/or maintain after each hop a prediction of the emotion classification corresponding to the speech. Based on the determined emotion classification, the speech emotion recognition system can output the emotion to a display or otherwise inform a system (e.g., an HCI system) communicatively coupled to the speech emotion recognition system for producing an appropriate response to the speech associated with the emotion.

As mentioned above, a number of problems exist with conventional speech recognition systems, particularly in relation to prediction accuracy. For example, some conventional speech recognition systems use multi-modal information independently and thereafter concatenate end results. For example, some conventional speech recognition systems separately model audio information and textual information to obtain an audio encoding vector and a textual encoding vector, respectively. In this example, the audio encoding vector only includes audio information and the textual encoding vector only includes textual information. Further, some conventional speech recognition systems then concatenate the audio encoding vector and the textual encoding vector for passing to a probability function to determine a probability distribution of emotions. Accordingly, the probability distribution is based on concatenated inputs having no context relative to each other. In other terms, the probability distribution is based on inputs having limited information. As a result, conventional speech recognition systems suffer from decreased accuracy of the speech emotion probability distribution and, in turn, increased misclassifications of speech emotion.

The speech emotion recognition system provides several advantages over conventional speech recognition systems. As one example, the speech emotion recognition system improves accuracy of emotion classification. In particular, by integrating audio information and textual information together throughout a jointly modeled neural network architecture, the speech emotion recognition system can use more information from the speech signal. More specifically, by using the neural attention mechanism, the speech emotion recognition system can combine and/or modify feature vectors to generate attention output that, when used to generate hidden feature vectors (e.g., inputs to the probability function), provides context to one or more feature vectors. As a consequence, the speech emotion recognition system can better learn the contexts and features associated with a sequence of words, and then predict a more accurate emotion classification (e.g., for generating more appropriate HCI responses).

In addition, the speech emotion recognition system can improve flexibility relative to conventional systems. A lack of flexibility or ability to recognize changing emotion of conventional systems leads to inaccurate emotion classification. The speech emotion recognition system can flexibly adjust to, and account for, changes in emotion. Indeed, by informing audio signals with textual signals and vice versa, the additional context can allow the speech emotion recognition system to flexibly accommodate a wide variety of emotions.

As illustrated by the foregoing discussion, the present disclosure utilizes a variety of terms to describe features and benefits of the speech emotion recognition system. Additional detail is now provided regarding the meaning of these terms. For example, as used herein, the term "emotion" refers to a state of mind. In particular, emotion can include the state of mind of a speaker (i.e., person) as derived from and/or reflected in uttered speech of the speaker. To illustrate, emotion can include classes, categories, feelings, hybrid emotional states, etc. like happy, sad, neutral, angry, nervous, panicked, and the like. Relatedly, the term "candidate emotions" refers to a group of potential emotions from which the speech emotion recognition system may select as corresponding to the speech.

Additionally, as used herein, the term "textual sequence" refers to a group of words. In particular, the "textual sequence" can include a group of words having some structural, grammatical, or other suitable association with each other. For example, the textual sequence may include a phrase, a hyphenation, a clause, a sentence, a paragraph, a column, a row, etc.

Additionally, as used herein, the term "acoustic sequence" refers to audio of the utterance of a group of words or sounds. In particular, the "acoustic sequence" can comprise an audio recording of the speaking or utterance of a sequence of words. In one or more embodiments, the textual sequence is a transcription of the acoustic sequence.

Further, as used herein, the term "bi-directional recurrent encoder" or "BRE" refers to a type of neural network model. In particular, the bi-directional recurrent encoder can include a model of interconnected artificial neurons (e.g., organized in layers or hops) that communicate and learn to approximate complex functions and generate outputs based on a plurality of inputs provided to the model (e.g., to encode audio data and/or textual data). For instance, the bi-directional recurrent encoder may include one or more machine learning algorithms. In addition, the bi-directional recurrent encoder can refer to an algorithm (or set of algorithms) that implements deep learning techniques that utilize a set of algorithms to model high-level abstractions in data.

Additionally, as used herein, the term "state" refers to a condition of a neural network, like a bi-directional recurrent encoder, while processing inputs at a specific point in time (e.g., at a particular time step). In particular, a state corresponds to a particular input to the neural network. For example, a state can correspond to a word from a sequence of words being processed by the speech emotion recognition system. Thus, as an example, the first word in a sequence of words can correspond to state 1, a second word to state 2, etc.

Further, as used herein, the term "neural attention mechanism" refers to a neural network component that generates values corresponding to attention-controlled features. In particular, the neural attention mechanism can generate attention output. For example, the neural attention mechanism can be trained to control access to memory, allowing certain features to be stored and later accessed while processing neural network inputs in order to learn the context of a given input (e.g., a given hidden state corresponding to the input) without relying solely on that input. In one or more embodiments, the neural attention mechanism corresponds to a particular neural network layer (e.g., hop in the MHA model) and generates the attention output with consideration of audio and textual information of the speech. The term "attention output" refers to the one or more values generated by the neural attention mechanism as used by a neural network (e.g., the bi-directional recurrent encoder). In particular, the attention output can be included in a matrix or vector that combines (e.g., via concatenation, dot product multiplication, etc.) feature vectors.

Further, as used herein, the term "feature vectors" refers to various types of vectors including representations of information regarding features or attributes for a particular set of data. In particular, feature vectors may include audio feature vectors that comprise audio data feature information, textual feature vectors that comprise textual data feature information, hidden feature vectors that comprise representations of information in one or more hidden states, etc. As examples, the audio feature vector may include representations of audio data feature information like intonation, tone, stress, rhythm, pitch, loudness (e.g., intensity, amplitude, etc.), length of sounds (e.g., duration), timbre, fundamental frequency, spectral characteristics, etc. or latent features. As additional examples, the textual feature vector may include representations of textual data feature information like punctuation, hyphenation, spelling, capitalization, grammar, word bi-directional recurrent encoders, emphasis, sentence structure, paragraph structure, literal meanings (e.g., dictionary meanings), contextual meanings, humor, irony, satire, sarcasm, figures of speech, rhetorical devices (e.g., alliteration, analogy, hyperbole, oxymorons, understatements, etc.), and the like or latent features. As further examples, the hidden feature vector may include feature information from both the audio feature vector and the textual feature vector with one or more modifications thereto according to the attention output.

Further, as referred to herein, the term "probability distribution" refers to a probability spread of possible values (e.g., statistical likelihoods) that a variable can assume. In particular, the probability distribution can include probabilities that an emotion corresponds to one or more candidate emotions. For example, the speech emotion recognition system may pass the hidden feature vector through a softmax function to determine the probability distribution of speech in numerical, graphical, or other suitable form corresponding to the plurality of candidate emotions of happy, sad, angry, neutral, etc.

Further, as referred to herein, the terms "text," "textual data," and/or "transcript" refers to a textual representation of a sequence of words. In particular, any of the foregoing terms can refer to a textual representation of speech captured within audio content, where the text content has been generated by a human or machine transcribing the audio content. For example, a transcript can include text context corresponding to a meeting between two or more people, text content corresponding to a dictation, text content corresponding to instructions from a person to a machine, etc. Additionally, textual data can constitute one of the modalities upon which the speech emotion recognition system performs one or more acts described in this disclosure. Relatedly, the terms "audio" and/or "audio data" refer to sound content. In particular, audio/audio data can include the sound content for a sequence of words, whether directly sampled, reproduced, relayed, or recorded. For example, audio can include sound content corresponding to a meeting between two or more people, sound content corresponding to a dictation, sound content corresponding to instructions from a person to a machine, etc. Additionally, audio data constitutes another one of the modalities upon which the speech emotion recognition system performs one or more acts described in this disclosure.

Additional detail regarding the speech emotion recognition system will now be provided with reference to the figures. For example, FIG. 1 illustrates an example environment 100 in which a speech emotion recognition system 100 can operate in accordance with one or more embodiments. As shown, the environment 100 can include a server(s) 102, a third-party system 108, a network 110, client devices 112a-112n, and users 116a-116n.

Although the environment 100 of FIG. 1 is depicted as having a particular number of components, the environment 100 can have any number of additional or alternative components (e.g., any number of servers, third-party systems, client devices, or other components in communication with the speech emotion recognition system 106 via the network 110). Similarly, although FIG. 1 illustrates a particular arrangement of the server(s) 102, the third-party system 108, the network 110, the client devices 112a-112n, and the users 116a-116n, various additional arrangements are possible.

The server(s) 102, the third-party system 108, the network 110, and the client devices 112a-112n may be communicatively coupled with each other either directly or indirectly (e.g., through the network 110 discussed in greater detail below in relation to FIG. 10). Moreover, the server(s) 102, the third-party system 108, and the client devices 112a-112n may include a computing device (including one or more computing devices as discussed in greater detail with relation to FIG. 9).

As mentioned above, the environment 100 illustrated in FIG. 1 includes the server(s) 102. The server(s) 102 can generate, store, receive, and/or transmit data, including audio data and text data corresponding to speech. For example, the server(s) 102 can receive audio data from one or more of the client devices 112a-112n, and then transmit the audio data to the third-party system 108. In return, the server(s) 102 can receive text data from the third-party system 108 based on the transmitted audio data. In one or more embodiments, the server(s) 102 comprises a data server. The server(s) 102 can also comprise a communication server or a web-hosting server.

As shown in FIG. 1, the server(s) 102 can include an analytics system 104. In particular, the analytics system 104 can collect, manage, and utilize analytics data. For example, the analytics system 104 can collect analytics data related to speech, textual data (e.g., the context of the sequences of words), and/or audio content that conveys speech emotion in light of the contexts. The analytics system 104 can collect the analytics data in a variety of ways. For example, in one or more embodiments, the analytics system 104 causes the server(s) 102 and/or the third-party system 108 to track data related to word sequences, meanings, contexts, and emotion and report the tracked data for storage on a database. In one or more embodiments, the analytics system 104 receives the data directly from the client devices 112a-112n via data stored thereon.

Additionally, the server(s) 102 can include the speech emotion recognition system 106. In particular, in one or more embodiments, the speech emotion recognition system 106 can generate a predicted speech emotion. For example, the speech emotion recognition system 106 can use the server(s) 102 to generate hidden feature vectors and generate a speech emotion probability distribution based on the hidden feature vectors for predicting the speech emotion.

For example, in one or more embodiments, the server(s) 102 can utilize a speech emotion recognition neural network having one or more bi-directional recurrent encoders. For instance, the server(s) 102 can use an audio bi-directional recurrent encoder and a text bi-directional recurrent encoder to generate feature vectors corresponding to the speech. The server(s) 102 can further use a neural attention mechanism to intelligently blend feature vectors (e.g., an audio feature vector and a textual feature vector) to generate attention output. Additionally, the server(s) 102 can use the attention output to modify one or more of the feature vectors and thereby generate the hidden feature vector mentioned above for predicting the speech emotion.

In one or more embodiments, the third-party system 108 optionally includes a third-party system for generating transcripts based on audio data of speech. For example, in some embodiments, the third-party system 108 can receive audio content from a device (e.g., one of the client devices 112a-112n or a separate audio recording device) and can generate a transcript corresponding to speech captured within the audio content. The third-party system 108 can include any system (e.g., an automatic speech recognition (ASR) system) capable of transcribing the speech of audio content to create a transcript. The third-party system 108 can transmit or provide access to generated transcripts to the speech emotion recognition system 106 for speech emotion prediction. It should be noted, however, that in some embodiments, at least one of the client devices 112a-112n or the server(s) 102 has functionality for transcribing audio content. In other embodiments, the speech emotion recognition system 106 can generate the transcript based on the speech in the audio content.

In one or more embodiments, the client devices 112a-112n can include computer devices that allow users of the devices (e.g., the users 116a-116n) to provide speech to the speech emotion recognition system 106. For example, the client devices 112a-112n can include smartphones, tablets, desktop computers, laptop computers, or other electronic devices. The client devices 112a-112n can include one or more applications (e.g., the client application 114) that allow the users 116a-116n to provide speech to the speech emotion recognition system 106. For example, the client application 114 can include a software application installed on the client devices 112a-112n. Additionally, or alternatively, the client application 114 can include a software application hosted on the server(s) 102, which may be accessed by the client devices 112a-112n through another application, such as a web browser.

The speech emotion recognition system 106 can be implemented in whole, or in part, by the individual elements of the environment 100. Indeed, although FIG. 1 illustrates the speech emotion recognition system 106 implemented at the server(s) 102, different components of the speech emotion recognition system 106 can be implemented in any of the components of the environment 100. In particular, part of, or all of, the speech emotion recognition system 106 can be implemented by a client device 112a-112n. The components of the speech emotion recognition system 106 will be discussed in more detail with regard to FIG. 7 below.

Figure 2:
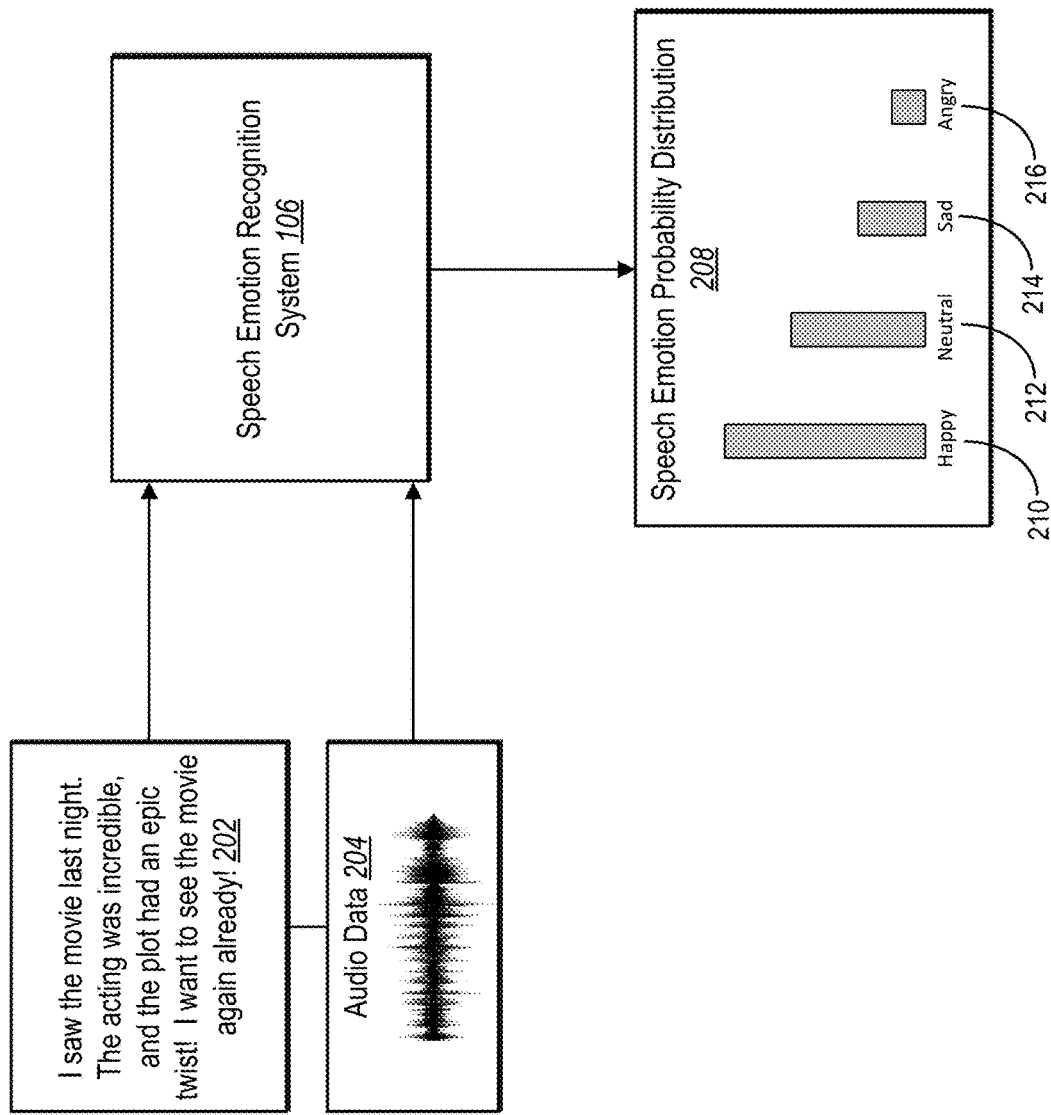
FIG. 2 illustrates an overview of a speech emotion recognition system generating a predicted emotion in accordance with one or more embodiments.

As mentioned above, the speech emotion recognition system 106 can predict speech emotion. FIG. 2 illustrates a block diagram of the speech emotion recognition system 106 generating a predicted emotion in accordance with one or more embodiments. As illustrated in FIG. 2, the speech emotion recognition system 106 obtains text data 202 and audio data 204, and, as an output, generates a speech emotion probability distribution 208. In these or other embodiments, the text data 202 and the audio data 204 may include raw, unprocessed data. Indeed, based on the uttered speech, the speech emotion recognition system 106 can determine a corresponding emotion from a group of candidate emotions 210-216.

In some embodiments, the speech emotion recognition system 106 may obtain the text data 202 by generating, at the speech emotion recognition system 106, a transcript of the audio data 204. Additionally or alternatively, the speech emotion recognition system 106 may obtain one or more portions of the text data 202 by receiving a transcript of the audio data 204 from the third-party system 108 (e.g., an ASR system and/or software like Google® Cloud Speech API). In these or other embodiments, the speech emotion recognition system 106 may request for the transcript of the audio data 204 from the third-party system 108. In other embodiments, no request is needed, and the speech emotion recognition system 106 can automatically receive the audio data 204 (e.g., according to predetermined arrangements with the third-party system 108). In one example, the speech emotion recognition system 106 may send the audio data 204 to the third-party system 108 for generating a transcript to be returned as the text data 202. In other embodiments, the speech emotion recognition system 106 may receive the text data 202 in the form of a transcript generated based on the audio data 204, for example, by one of the client devices 112a-112n. Additionally or alternatively, the speech emotion recognition system 106 may receive the text data 202 in the form of a transcript file (e.g., of file types like .pdf, .docx, .pptx, etc.) generated before the corresponding audio data 204 is generated (e.g., for a scripted introduction by a master of ceremonies, an upcoming State of the Union address, etc.).

Similarly, the speech emotion recognition system 106 may obtain the audio data 204 from the third-party system 108. In these or other embodiments, the speech emotion recognition system 106 may request for the audio data 204 from the third-party system 108 (e.g., in addition to the text data 202). In other embodiments, no request is needed, and the speech emotion recognition system 106 can automatically receive the audio data 204 (e.g., according to predetermined arrangements with the third-party system 108). Additionally or alternatively, the speech emotion recognition system 106 can obtain the audio data 204 directly from one or more of the client devices 112a-112n (e.g., in real-time, in accordance with a buffer or delay, or after completion of the uttered speech). For example, the speech emotion recognition system 106 may receive, from one or more of the client devices 112a-112n, the audio data 204 on a rolling-basis as a conversation proceeds between two or more users 116a-116n respectively associated with the client devices 112a-112n.

Based on the text data 202 and the audio data 204 obtained by the speech emotion recognition system 106, the speech emotion recognition system 106 can generate the speech emotion probability distribution 208 that indicates respective probabilities that the speech (i.e., the text data 202 and the audio data 204 together) is associated with one of the candidate emotions 210-216. In this instance, the speech emotion recognition system 106 may determine, based on the speech emotion probability distribution 208, that the speech corresponds to the candidate emotion 210 (i.e., the "happy" emotion).

Figure 3:
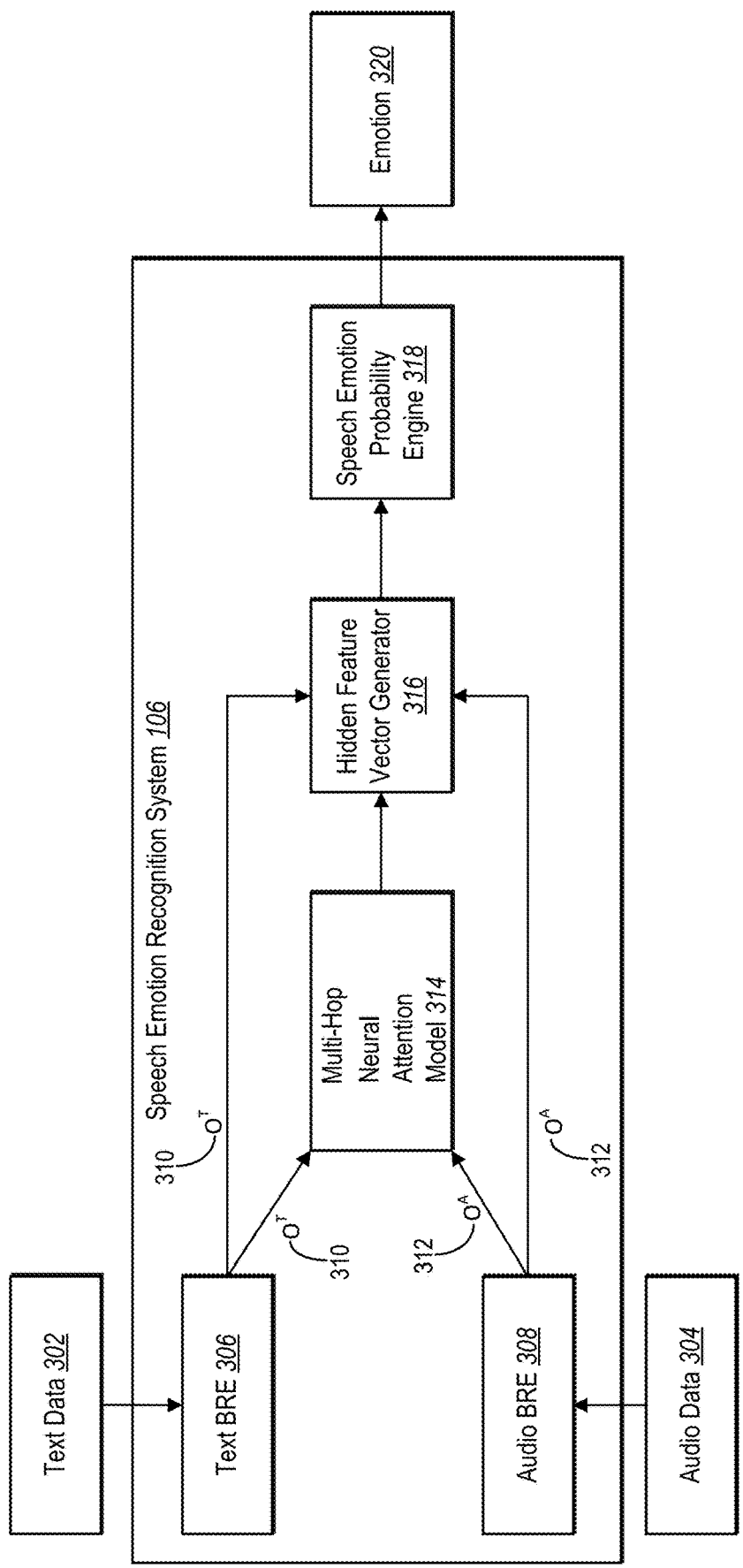
FIG. 3 illustrates a block diagram of an example data flow between components in a speech emotion recognition system generating a predicted emotion in accordance with one or more embodiments.

As mentioned above, the speech emotion recognition system 106 can utilize one or more bi-directional recurrent encoders and a multi-hop neural attention model to predict speech emotion. FIG. 3 illustrates a block diagram of an example data flow between components in the speech emotion recognition system 106 for determining an emotion 320 in accordance with one or more embodiments. As shown in FIG. 3, the data flow proceeds between components of the speech emotion recognition system 106 that include a text bi-directional recurrent encoder 306, an audio bi-directional recurrent encoder 308, a multi-hop neural attention model 314, a hidden feature vector generator 316, and a speech emotion probability engine 318. With text data 302 and audio data 304 as inputs to the speech emotion recognition system 106, the speech emotion recognition system 106 can determine the emotion 320.

As just mentioned, the speech emotion recognition system 106 can obtain the text data 302 and the audio data 304 as inputs. In some embodiments, however, the speech emotion recognition system 106 may pre-process one or both of the text data 302 or the audio data 304 (e.g., for converting into vector form). For example, prior to feeding the text data 302 to the text bi-directional recurrent encoder 306, the speech emotion recognition system 106 may tokenize one or more words in a textual sequence of the text data 302 into a sequence of tokens (e.g., indexed tokens). The speech emotion recognition system 106 can then convert, using a word-embedding layer, the sequence of tokens to create a textual input vector for passing to the text bi-directional recurrent encoder 306. For example, the speech emotion recognition system 106 may pass each token through the word-embedding layer that converts a word index to a corresponding n-dimensional vector that includes additional contextual meaning between words. Additionally or alternatively, for example, the speech emotion recognition system 106 may pre-process aspects of the audio data 304 (e.g., generate an audio input vector for passing to the audio bi-directional recurrent encoder 308).

After pre-processing, if performed, the speech emotion recognition system 106 may pass the text data 302 (e.g., in the form of the textual input vector) to the text bi-directional recurrent encoder 306 and/or pass the audio data 304 (e.g., in the form of the audio input vector) to the audio bi-directional recurrent encoder 308. At the text bi-directional recurrent encoder 306, the speech emotion recognition system 106 can convert the text data 302 into a textual feature vector 310. Similarly, at the audio bi-directional recurrent encoder 308, the speech emotion recognition system 106 can convert the audio data 304 into an audio feature vector 312. The speech emotion recognition system 106 can then send the textual feature vector 310 and the audio feature vector 312 to the multi-hop neural attention model 314 and the hidden feature vector generator 316.

At the multi-hop neural attention model 314, the speech emotion recognition system 106 can intelligently blend the textual feature vector 310 and the audio feature vector 312 together. In this manner, the speech emotion recognition system 106 can obtain context for various portions corresponding between the textual feature vector 310 and the audio feature vector 312. Then the speech emotion recognition system 106 can focus on relevant portions of the textual feature vector 310 and/or the audio feature vector 312. Furthermore, the speech emotion recognition system 106 can generate an attention output from the multi-hop neural attention model 314 that feeds into the hidden feature vector generator 316. In these or other embodiments, the attention output is contextualized (e.g., includes both audio data feature information and textual data feature information that inform each other and/or otherwise includes feature information corresponding to both the textual feature vector 310 and the /312 on a state level).

At the hidden feature vector generator 316, the speech emotion recognition system 106 can generate a hidden feature vector based on the attention output from the multi-hop neural attention model 314 and one or both of the textual feature vector 310 from the text bi-directional recurrent encoder 306 or the audio feature vector 312 from the audio bi-directional recurrent encoder 308. In this manner, the speech emotion recognition system 106 can modify one or both of the textual feature vector 310 or the audio feature vector 312 according to the attention output from the multi-hop neural attention model 314. Further, the speech emotion recognition system 106 can then feed the hidden feature vector to the speech emotion probability engine 318 to generate a speech emotion probability distribution (e.g., the speech emotion probability distribution 208 of FIG. 2). For example, the speech emotion probability engine 318 may use a softmax function that receives the hidden feature vector and outputs the speech emotion probability distribution including a group of candidate emotions. Based on the speech emotion probability distribution, the speech emotion recognition system 106 may select, using the speech emotion probability engine 318, the candidate emotion having the highest probability or likelihood of corresponding to the speech as comprised of text data 302 and the audio data 304. Thus, the speech emotion recognition system 106 may output the selected candidate emotion as the emotion 320.

Figure 4A:
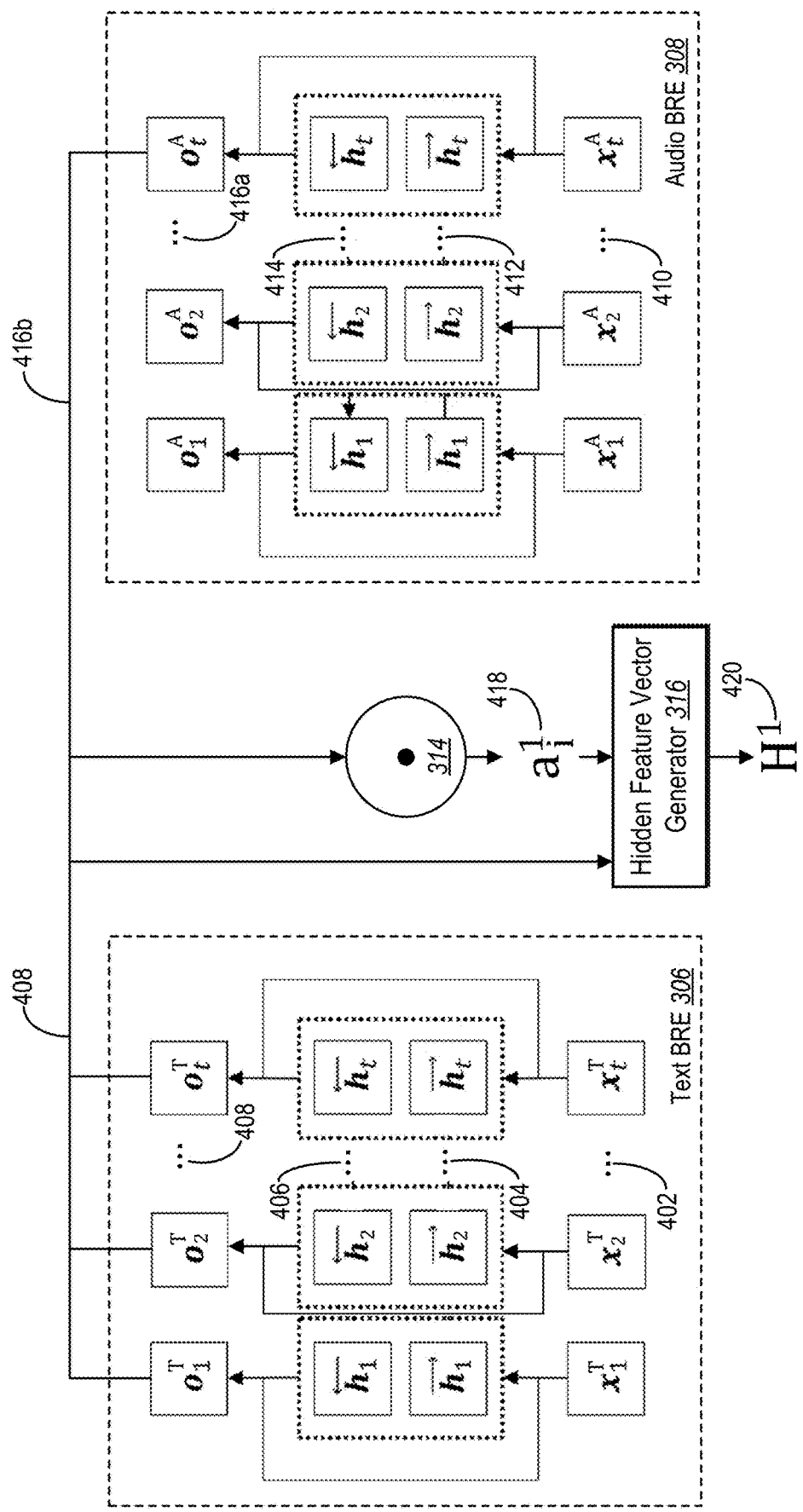
FIGS. 4A-4C each illustrate a schematic diagram of an architecture of a multi-hop neural attention model in accordance with one or more embodiments.
Figure 4B:
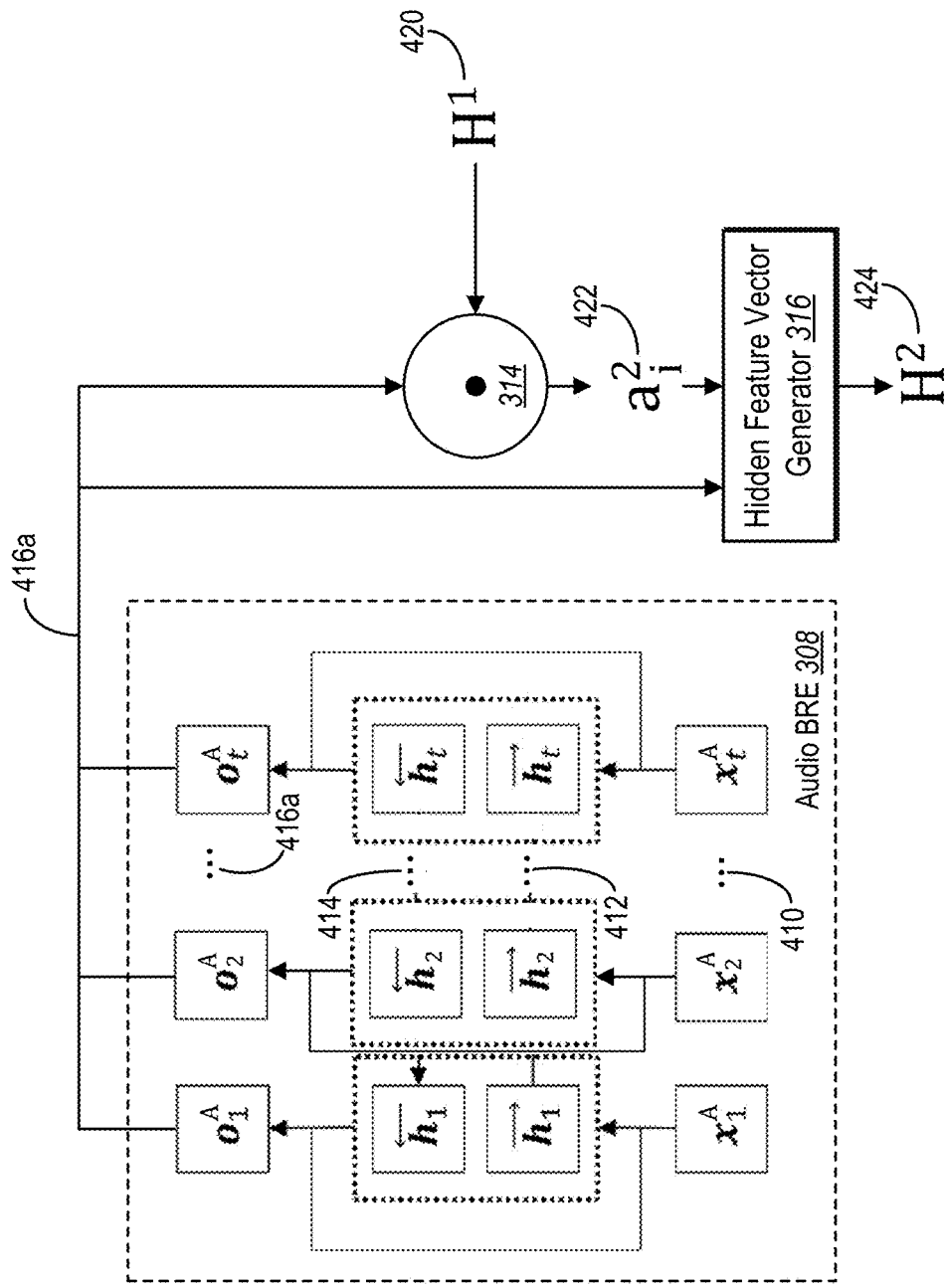
Figure 4C:
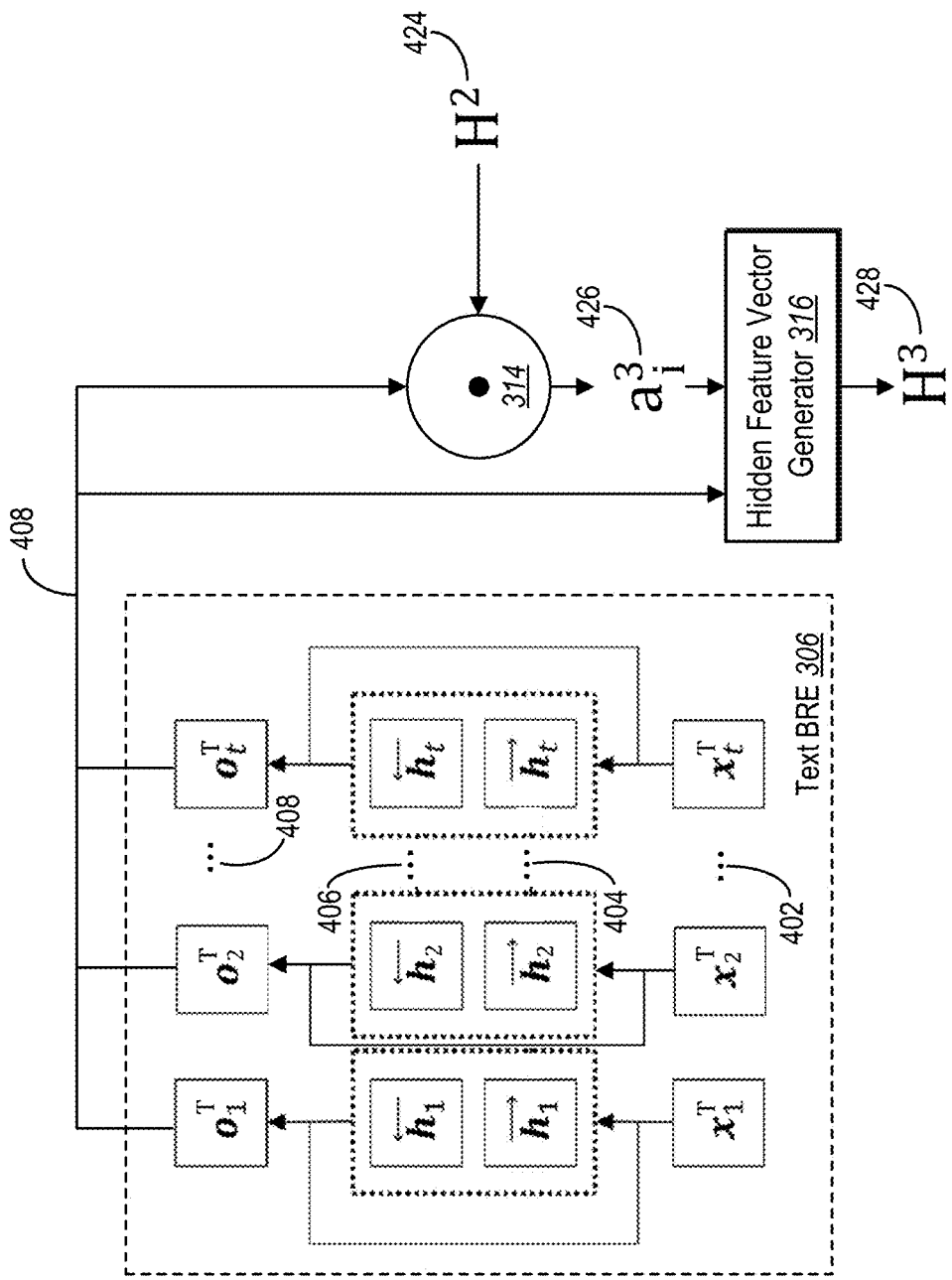

As mentioned above, the speech emotion recognition system 106 can include a neural attention mechanism (e.g., a multi-hop neural attention model) that can intelligently blend the audio feature vector and the textual feature vector from respective bi-directional recurrent encoders. Accordingly, FIGS. 4A-4C each illustrate a schematic diagram of the speech emotion recognition system 106 in accordance with one or more embodiments. In particular, FIGS. 4A-4C illustrate an example embodiment of the speech emotion recognition system 106 progressing through example hops in the multi-hop neural attention model. FIG. 4A illustrates a first hop, FIG. 4B illustrates a second hop, and FIG. 4C illustrates a third hop. As will be evident in FIGS. 4A-4C, at least a portion of an audio feature vector or at least a portion of a textual feature vector can provide context to inputs at a neural attention mechanism. In doing so, the speech emotion recognition system 106 can determine a hidden feature vector based on attention outputs with information exploited from both audio and textual modalities to improve speech recognition capabilities. Additionally, the algorithms and acts described with reference to FIGS. 4A-4C can comprise the corresponding structure for performing a step for generating a hidden feature vector that includes attention output of a neural attention mechanism based on both the audio feature vector and the textual feature vector.

FIG. 4A, as shown, illustrates some components of the speech emotion recognition system 106, including the text bi-directional recurrent encoder 306, the audio bi-directional recurrent encoder 308, the multi-hop neural attention model 314, and the hidden feature vector generator 316. In particular, FIG. 4A illustrates the speech emotion recognition system 106 generating a first hidden feature vector 420 represented by $H^1$. Indeed, the first hidden feature vector 420 reflects information from both the text bi-directional recurrent encoder 306 and the audio bi-directional encoder 308, which, as mentioned above, can lead to improved learning of contexts and features associated with a sequence of words. To generate the first hidden feature vector 420, the speech emotion recognition system 106 can process input vectors 402, 410 at the text bi-directional recurrent encoder 306 and the audio bi-directional recurrent encoder 308, respectively. In these or other embodiments, the input vector 402 and the input vector 410 may be the same as or similar to the textual input vector and the audio input vectors, respectively, described above in conjunction with FIG. 3. Accordingly, in one or more embodiments, the speech emotion recognition system 106 can receive at the text bi-directional recurrent encoder 306, as the input vector 402, embeddings corresponding to each word in a sequence of words (e.g., for each state 1, 2, and so forth to the t-th state represented as $x_1^T, x_2^T, \ldots x_t^T$). For example, the speech emotion recognition system 106 can apply an embedding algorithm (e.g., a word-to-vector algorithm) to each word and provide the resulting embeddings to the text bi-directional recurrent encoder 306 as the input vector 402. In some embodiments, the text bi-directional recurrent encoder 306 can include a word embedding layer (e.g., as an input layer) that generates the embeddings for the sequence of words.

Further, in some embodiments, the speech emotion recognition system 106 can receive at the audio bi-directional recurrent encoder 308, as the input vector 410, extracted features in vector form (e.g., for each state 1, 2, and so forth to the t-th state represented as $x_1^A, x_2^A, \ldots x_t^A$) comprising Mel-frequency cepstral coefficients (MFCC) and/or prosodic features. Additionally, the speech emotion recognition system 106 may apply one or more pre-processing acts in generating the input vector 410. For example, the speech emotion recognition system 106 may apply first/second order derivatives, audio segment frame size/rate adjustment (e.g., relative to the Hamming window), concatenation of values, minimization of the cross-entropy loss function using the Adam optimizer, regularization (e.g., via the dropout method), etc.

As further shown in FIG. 4A, the speech emotion recognition system 106 can pass the input vectors 402, 410 to the respective bi-directional recurrent layers of the text bi-directional recurrent encoder 306 and the audio bi-directional recurrent encoder 308. Additionally, the speech emotion recognition system 106 can pass one or more portions of the input vectors 402, 410 forward (e.g., bypassing the bi-directional recurrent layers) for use in generating a textual feature vector 408 and an audio feature vector 416a, respectively. In these or other embodiments, the textual feature vector 408 and the audio feature vector 416a can be the same as or similar to the textual feature vector 310 and the audio feature vector 312, respectively, of FIG. 3.

At the bi-directional recurrent layers of the text bi-directional recurrent encoder 306, the speech emotion recognition system 106 can generate hidden representations 404, 406 from a forward long short-term memory (LSTM) and a backward LSTM, respectively. Similarly, at the bi-directional recurrent layers of the audio bi-directional recurrent encoder 308, the speech emotion recognition system 106 can generate hidden representations 412, 414 from another forward LSTM and another backward LSTM, respectively. For both the hidden representations 404, 412 respectively indicated in the text bi-directional recurrent encoder 306 and the audio bi-directional recurrent encoder 308 by $\vec{h}_1, \vec{h}_2, \ldots \vec{h}_t$, the hidden representations 404, 412 may be generally represented by the following expression: $\vec{h}_t = f_\theta(\vec{h}_{t-1}, \vec{x}_t) + \vec{x}_t$, wherein: $f_\theta$ represents a forward LSTM having a weight parameter $\theta$; $\vec{h}_{t-1}$ represents a previous hidden representation; and $\vec{x}_t$ represents a t-th textual data feature for the hidden representation 404 and a t-th audio data feature like an MFCC feature for the hidden representation 412. Analogously, for both the hidden representations 406, 414 respectively indicated in the text bi-directional recurrent encoder 306 and the audio bi-directional recurrent encoder 308 by $\overleftarrow{h}_1, \overleftarrow{h}_2, \ldots \overleftarrow{h}_t$, the hidden representations 406, 416 may be generally represented by the following expression:

$\overleftarrow{h}_t = f'_\theta(\overleftarrow{h}_{t+1}, \tilde{x}_t) + \tilde{x}_t$, wherein: $f'_\theta$ represents a backward LSTM having a weight parameter $\theta$; $\overleftarrow{h}_{t+1}$ represents a next hidden representation; and $\tilde{x}_t$ represents a t-th textual data feature for the hidden representation 406 and a t-th audio data feature like an MFCC feature for the hidden representation 414.

With the hidden representations 404, 406 generated at the text bi-directional recurrent encoder 306, the speech emotion recognition system 106 can concatenate the hidden representations 404, 406 to generate the textual feature vector 408. Additionally or alternatively, the speech emotion recognition system 106 can generate the textual feature vector 408 by modifying one or more aspects of the concatenation of the hidden representations 404, 406 according to the input vector 402 represented by $x_i^T$ (e.g., by adding features included within the input vector 402 to the concatenation of the hidden representations 404, 406). Additionally or alternatively, the speech emotion recognition system 106 may add one or more additional feature vectors to the concatenation of the hidden representations 404, 406 to generate the textual feature vector 408. Accordingly, the textual feature vector 408 may be represented by $o_i^T$ as a function of $[\overrightarrow{h}_t, \overleftarrow{h}_t], x_i^T$, and/or any suitable feature vector to provide more information to the textual feature vector 408.

Likewise, with the hidden representations 412, 414 generated at the audio bi-directional recurrent encoder 308, the speech emotion recognition system 106 can concatenate the hidden representations 412, 414 to generate the audio feature vector 416a. Additionally or alternatively, the speech emotion recognition system 106 can generate the audio feature vector 416a by modifying one or more aspects of the concatenation of the hidden representations 412, 414 according to the input vector 410 represented by $x_i^A$ (e.g., by adding features included within the input vector 410 to the concatenation of the hidden representations 412, 414). Additionally or alternatively, the speech emotion recognition system 106 may add one or more additional feature vectors (e.g., a prosodic feature vector) to the concatenation of the hidden representations 412, 414 to generate the audio feature vector 416a. Accordingly, the audio feature vector 416a may be represented by $o_i^A$ as a function of $[\overrightarrow{h}_t, \overleftarrow{h}_t], x_i^A$ and/or any suitable feature vector to provide more information to the audio feature vector 416a.

As further shown in FIG. 4A, the speech emotion recognition system 106 can pass the textual feature vector 408 and a portion of the audio feature vector 416a at the last state (i.e., audio feature vector portion 416b represented by $o_t^A$) to the multi-hop neural attention model 314. At the multi-hop neural attention model 314, the speech emotion recognition system 106 can determine a first attention output 418 represented by $a_i^1$ for the first hop. In particular, the speech emotion recognition system 106 can cause the multi-hop neural attention model 314 to determine the first attention output 418 using the following expression:

$$a_i^1 = \frac{e^{((o_t^A)^\top o_i^T)}}{\sum_i e^{((o_t^A)^\top o_i^T)}},$$

wherein: (i=1, . . . t); $o_t^A$ represents a portion of the audio feature vector 416a at the last state (i.e., the audio feature vector portion 416b); $o_i^T$ represents the textual feature vector 408; the term e represents the base of the natural logarithm for an exponential function; the operator $\Sigma$ is a summation operator; and the operator T is a transpose operator. In this manner, the speech emotion recognition system 106 can cause the multi-hop neural attention model 314 to use the audio feature vector portion 416b as a context vector and can apply attention methods to the textual feature vector 408, thereby generating the first attention output 418.

Further illustrated in FIG. 4A, the speech emotion recognition system 106 can pass the first attention output 418 to the hidden feature vector generator 316. There, the speech emotion recognition system 106 can cause the hidden feature vector generator 316 to generate the first hidden feature vector 420 based on the first attention output 418 and the textual feature vector 408. Specifically, the speech emotion recognition system 106 can cause the hidden feature vector generator 316 to generate the first hidden feature vector 420 according to the following expression: $H^1 = \Sigma_i a_i^1 o_i^T$, wherein each of the terms are defined above. Accordingly, the first hidden feature vector 420 can modify the textual feature vector 408 according to the first attention output 418 in the first hop.

After the speech emotion recognition system 106 generates the first hidden feature vector 420 at the hidden feature vector generator 316, the speech emotion recognition system 106 may pass the first hidden feature vector 420 through a softmax function to determine a speech emotion probability distribution described above (e.g., the speech emotion probability distribution 208). The softmax function may be represented according to the following expression: $\hat{u}_c$=softmax $((H)^T W + b)$, wherein: $\hat{u}_c$ represents the predicted probability distribution class of candidate emotions (e.g., as depicted in the speech emotion probability distribution 208 of FIG. 2); H represents the concatenation of $H^1$ and $o_t^A$ defined above; W represents a projection matrix that can be a learned model parameter based on training of the neural network layers; and b represents bias, another learned model parameter based on training of the neural network layers. Using the speech emotion probability distribution from the first hop, the speech emotion recognition system 106 may select one of the candidate emotions as corresponding to the speech. Moreover, the speech emotion recognition system 106 can (with improved accuracy as described above) select one of the candidate emotions as corresponding to the speech based on the first hidden feature vector 420 reflecting both textual information and audio information provided to the multi-hop neural attention model 314.

As mentioned above, FIG. 4B illustrates an example embodiment of the speech emotion recognition system 106 progressing through a second hop, arranged in accordance with at least one embodiment of the present disclosure. As shown, FIG. 4B includes the audio bi-directional recurrent encoder 308, the multi-hop neural attention model 314, and the hidden feature vector generator 316. In particular, FIG. 4B illustrates the audio bi-directional recurrent encoder 308 generating the audio feature vector 416a as described in FIG. 4A (i.e., based on the hidden representations 412, 414 and the input vector 410). However, the inputs to the multi-hop neural attention model 314 in FIG. 4B differ from that of FIG. 4A. Specifically, the speech emotion recognition system 106 can pass the entirety of the audio feature vector 416a to the multi-hop neural attention model 314, not just a portion corresponding to the last state (i.e., not just the audio feature vector portion 416b represented by $o_t^A$). In this manner, the speech emotion recognition system 106 can provide the context of audio information to other inputs at the multi-hop neural attention model 314, which, as mentioned above, can lead to improved learning of contexts and features associated with a sequence of words. In particular, the speech emotion recognition system 106 can pass the first hidden feature vector 420 (described above in relation to FIG. 4A) to the multi-hop neural attention model 314 with audio context provided by the audio feature vector 416a.

At the multi-hop neural attention model 314, the speech emotion recognition system 106 can determine a second attention output 422 represented by $a_i^2$ for the second hop in the MHA model. In particular, the speech emotion recognition system 106 can cause the multi-hop neural attention model 314 to determine the second attention output 422 using the following expression:

$$a_i^2 = \frac{e^{(H^1)^\top o_i^A}}{\sum_i e^{(H^1)^\top o_i^A}}$$

wherein: (i=1, . . . t); $o_i^A$ represents the audio feature vector 416a; $H^1$ represents the first hidden feature vector 420; the term e represents the base of the natural logarithm for an exponential function; the operator $\Sigma$ is a summation operator; and the operator T is a transpose operator. In this manner, the speech emotion recognition system 106 causes the multi-hop neural attention model 314 to use the first hidden feature vector 420 as a context vector and apply attention methods to the audio feature vector 416a, thereby generating the second attention output 422.

Further illustrated in FIG. 4B, the speech emotion recognition system 106 can pass the second attention output 422 to the hidden feature vector generator 316. There, the speech emotion recognition system 106 can cause the hidden feature vector generator 316 to generate the second hidden feature vector 424 based on the second attention output 422 and the audio feature vector 416a. Specifically, the speech emotion recognition system 106 can cause the hidden feature vector generator 316 to generate the second hidden feature vector 424 represented by $H^2$ according to the following expression: $H^2 = \Sigma_i a_i^2 o_i^A$, wherein each of the terms are defined above. Accordingly, the second hidden feature vector 424 modifies the audio feature vector 416a according to the second attention output 422.

After the speech emotion recognition system 106 generates the second hidden feature vector 424 at the hidden feature vector generator 316, the speech emotion recognition system 106 may pass the second hidden feature vector 424 through a softmax function to determine an updated speech emotion probability distribution. The softmax function may be represented according to the following expression: $\hat{u}_c = \text{softmax}((H)^T W + b)$, wherein H represents the concatenation of $H^1$ and $H^2$ defined above, and all other terms and operators are defined above. Using the updated speech emotion probability distribution from the second hop, the speech emotion recognition system 106 may select one of the candidate emotions as corresponding to the speech. Moreover, the speech emotion recognition system 106 can (with improved accuracy as described above) select one of the candidate emotions as corresponding to the speech based on the second hidden feature vector 424 reflecting both textual information and audio information provided to the multi-hop neural attention model 314.

As mentioned above, FIG. 4C illustrates an example embodiment of the speech emotion recognition system 106 progressing through a third hop, arranged in accordance with at least one embodiment of the present disclosure. As shown, FIG. 4C includes the text bi-directional recurrent encoder 306, the multi-hop neural attention model 314, and the hidden feature vector generator 316. In particular, FIG. 4C illustrates the audio bi-directional recurrent encoder 308 generating the textual feature vector 408 as described in FIG. 4A (i.e., based on the hidden representations 404, 406 and the input vector 402). However, the inputs to the multi-hop neural attention model 314 in FIG. 4B differ from that of FIG. 4A and FIG. 4B. Specifically, the speech emotion recognition system 106 can pass to the multi-hop neural attention model 314 the second hidden feature vector 424 (described above in relation to FIG. 4B) along with textual context provided by the textual feature vector 408. In this manner, the speech emotion recognition system 106 can provide the context of textual information to other inputs at the multi-hop neural attention model 314, which, as mentioned above, can lead to improved learning of contexts and features associated with a sequence of words.

At the multi-hop neural attention model 314, the speech emotion recognition system 106 can determine a third attention output 426 represented by $a^3$ for the third hop. In particular, the speech emotion recognition system 106 can cause the multi-hop neural attention model 314 to determine the third attention output 426 using the following expression:

$$a_i^3 = \frac{e^{(H^2)^\top o_i^T}}{\sum_i e^{(H^2)^\top o_i^T}}$$

wherein: (i 1, . . . t); $o_i^T$ represents the textual feature vector 408; $H^2$ represents the second hidden feature vector 424; the term e represents the base of the natural logarithm for an exponential function; the operator $\Sigma$ is a summation operator; and the operator T is a transpose operator. In this manner, the speech emotion recognition system 106 can cause the multi-hop neural attention model 314 to use the second hidden feature vector 424 as a context vector and apply attention methods to the textual feature vector 408, thereby generating the third attention output 426.

Further illustrated in FIG. 4C, the speech emotion recognition system 106 can pass the third attention output 426 to the hidden feature vector generator 316. There, the speech emotion recognition system 106 can cause the hidden feature vector generator 316 to generate a third hidden feature vector 428 based on the second hidden feature vector 424 and the textual feature vector 408. Specifically, the speech emotion recognition system 106 can cause the hidden feature vector generator 316 to generate the third hidden feature vector 428 represented by $H^3$ according to the following expression: $H^3 = \Sigma_i a_i^3 o_i^T$, wherein each of the terms are defined above. Accordingly, the third hidden feature vector 428 can modify the textual feature vector 408 according to the third attention output 426.

After the speech emotion recognition system 106 generates the third hidden feature vector 428 at the hidden feature vector generator 316, the speech emotion recognition system 106 may pass the third hidden feature vector 428 through a softmax function to determine an updated speech emotion probability distribution. The softmax function may be represented according to the following expression: $\hat{u}_c$=softmax $((H)^T W+b)$, wherein H represents the concatenation of $H^2$ and $H^3$ defined above, and all other terms and operators are defined above. Using the updated speech emotion probability distribution from the third hop, the speech emotion recognition system 106 may select one of the candidate emotions as corresponding to the speech. Moreover, the speech emotion recognition system 106 can (with improved accuracy as described above) select one of the candidate emotions as corresponding to the speech based on the third hidden feature vector 428 reflecting both textual information and audio information provided to the multi-hop neural attention model 314.

As mentioned above, the speech emotion recognition system 106 can use more information from the speech signal by integrating audio information and textual information together throughout a jointly modeled neural network architecture, thereby improving accuracy of predicted speech emotion compared to conventional systems. Researchers trained and evaluated various embodiments of the speech emotion recognition system 106. Specially, the researchers used a total of ten unique speakers. For consistent comparison with conventional systems, the researchers ensured that all utterances labeled "excitement" were merged with those labeled "happiness." The researchers assigned single categorical emotion to the utterance with majority of annotators agreed on the emotion labels. The final dataset contained 5,531 utterances in total (1,636 happy, 1,084 sad, 1,103 angry and 1,708 neutral). In the training process, the researchers performed 10-fold cross-validation where each 8, 1, 1 folds are used for the train set, development set, and test set, respectively.

After extracting 40-dimensional Mel-frequency cepstral coefficients (MFCC) feature (frame size is set to 25 ms at a rate of 10 ms with the Hamming window) using Kaldi, the researchers concatenated the feature with its first, second order derivates, making the feature dimension to 120. The researchers also extracted prosodic features and appended them to the audio feature vector. The researchers applied word-tokenizer to the transcripts and obtained sequential data for textual input.

The researchers set the maximum length of an audio segment to 750. The researchers minimized the cross-entropy loss function using the Adam optimizer with a learning rate of 1e−3 and gradients clipped with a norm value of 1. For the purposes of regularization, the researched applied the dropout method, 30%. The number of hidden units and the number of layers in the RNN for each model (BRE and MHA) were optimized on the development set.

FIG. 5 illustrates a table 500 reflecting experimental results regarding the effectiveness of the speech emotion recognition system 106 in accordance with the foregoing. As shown in FIG. 5, the table 500 is categorized by model 502, modality 504, weighted accuracy 506, and unweighted accuracy 508 using ground-truth transcript(s) and ASR-processed transcript(s). In particular, the table 500 depicts significant improvements for various models described in the present disclosure relative to conventional systems 510.

The data shown in FIG. 5 is obtained using the same validation data sets, namely 10-fold cross-validation comprised of 8, 1, 1 folds for training, development, and testing, respectively. Generally, the models 502 using dual modalities 504 of audio and text (represented by "A+T") have better weighted accuracy 506 and unweighted accuracy 508 values than the models 502 using only a single modality 504 of either audio (represented by "A") or text (represented by "T"). However, as shown in FIG. 5, the MHA models outperform all other models, including the conventional systems 510. Indeed, the weighted accuracy 506 and the unweighted accuracy 508 improve with each subsequent hop in the MHA models described in the present disclosure, apart from the third hop, which suggests that additional hops (e.g., beyond the first and second hops) in the MHA model may benefit from larger training data sets to avoid performance degradation. Still further, the MHA-2-ASR model of the present disclosure outperforms the conventional systems 510 notwithstanding erroneous transcripts (e.g., with a word error rate≈5.53%) from an ASR system. Thus, the acts and algorithms described in the present disclosure as performed by the speech emotion recognition system 106 provide improvements to the functioning of a computing device, which is evidenced in the example results depicted in FIG. 5.

Figure 6:
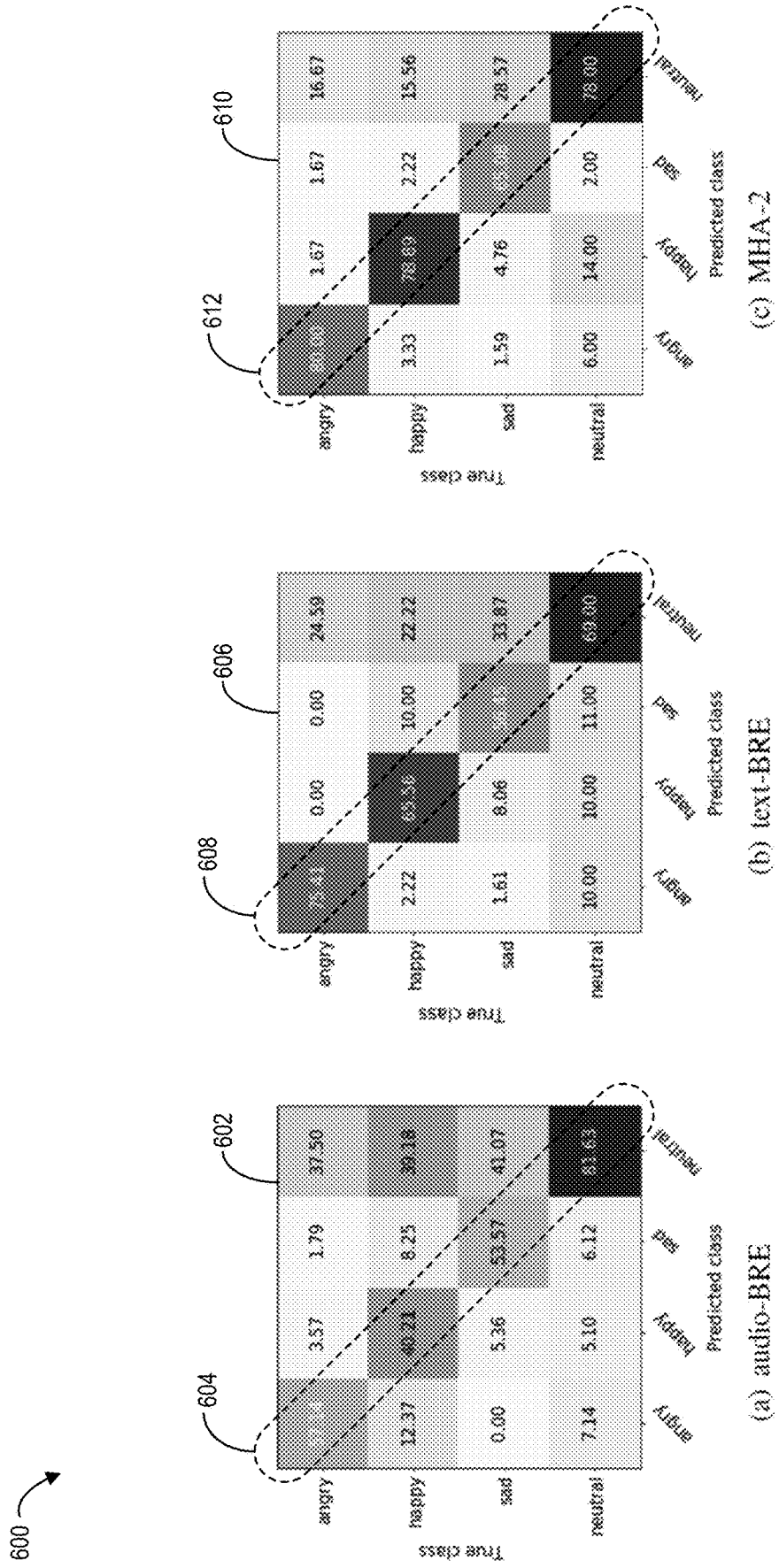
FIG. 6 illustrates graphs reflecting experimental results regarding the effectiveness of the speech emotion recognition system in accordance with one or more embodiments.

As mentioned above, the speech emotion recognition system 106 performs acts and algorithms to more accurately predict speech emotion compared to conventional systems. FIG. 6 illustrates graphs 602-610 reflecting experimental results regarding the effectiveness of the speech emotion recognition system 106 in accordance with one or more embodiments. As shown in FIG. 6, graphs 602-610 include confusion matrices for various models described in the present disclosure, including an audio bi-directional recurrent encoder (e.g., the audio bi-directional recurrent encoder 308 described above), a text bi-directional recurrent encoder (e.g., the text bi-directional recurrent encoder 306 described above), and an MHA-2 model (e.g., as described in conjunction with FIG. 4B).

As further shown in FIG. 6, the graphs 602-610 include, respectively, result rows 604-612. The result rows 604-612 indicate percentages for which the respective models correctly predict the speech emotion for a given class of emotion (e.g., angry, happy, sad, neutral). In particular, graph 610 shows that the MHA-2 model compensates for weaknesses of the single modality models and benefits from their respective strengths. Specifically, graph 610 for the MHA-2 model indicates significant performance gains in accuracy relative to the text bi-directional recurrent encoder for the emotion classes of angry, happy, sad, and neutral classes when comparing the result row 612 with result rows 604, 608. Likewise, graph 610 for the MHA-2 model indicates even more performance gains in accuracy relative to the audio bi-directional recurrent encoder for the emotion classes of angry, happy, and sad (neutral being similar) when comparing the result row 612 with result rows 604, 608. Thus, the acts and algorithms described in the present disclosure as performed by the speech emotion recognition system 106 provide improvements to the functioning of a computing device, which is evidenced in the example results depicted in the confusion matrices of FIG. 6.

Figure 7:
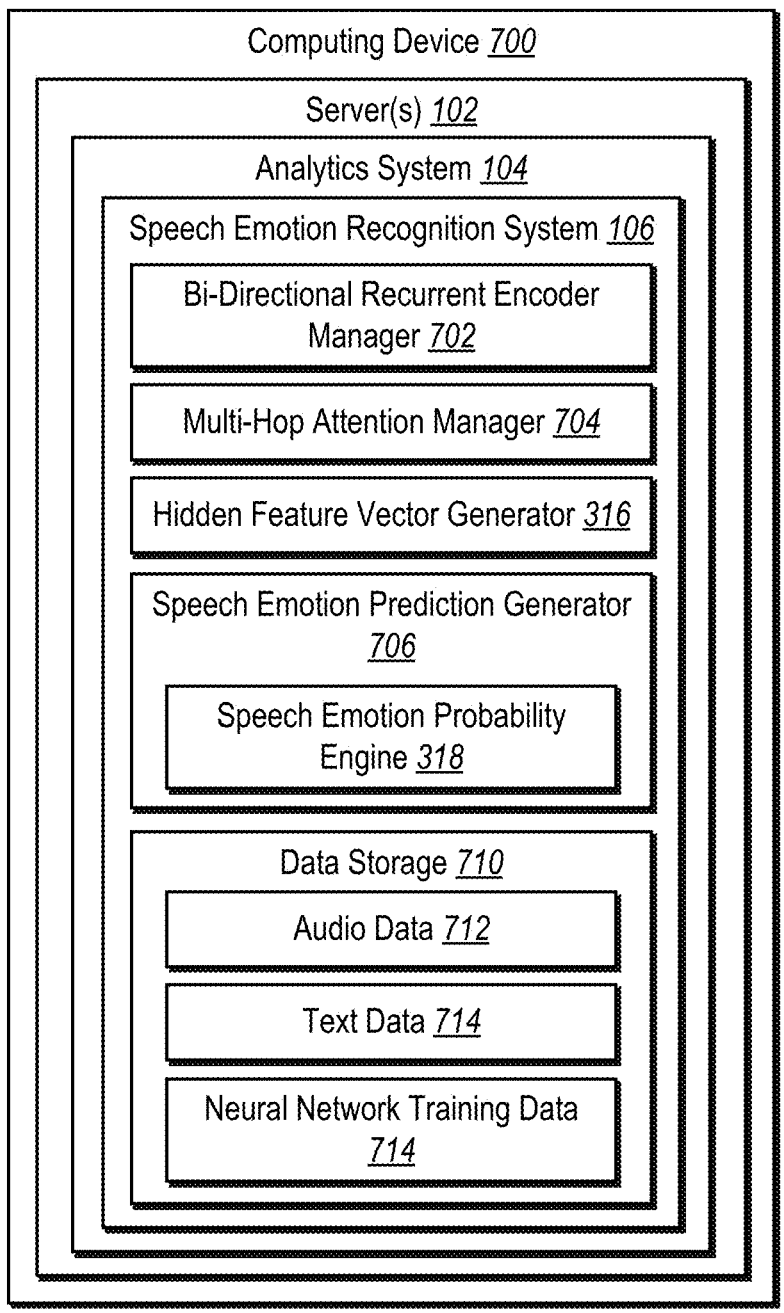
FIG. 7 illustrates an example schematic diagram of a speech emotion recognition system in accordance with one or more embodiments.

Turning to FIG. 7, additional detail will now be provided regarding various components and capabilities of the speech emotion recognition system 106. In particular, FIG. 7 illustrates an example schematic diagram of the speech emotion recognition system 106 implemented by a computing device 700 in accordance with one or more embodiments of the present disclosure. As shown, the speech emotion recognition system 106 is further implemented by the server(s) 102 and the analytics system 104. Also illustrated, the speech emotion recognition system 106 can include a bi-directional recurrent encoder manager 702, an MHA manager 704, the hidden feature vector generator 316, a speech emotion prediction generator 706, and data storage 710.

The bi-directional recurrent encoder manager 702 can train neural network layers within the audio bi-directional recurrent encoder and text bi-directional recurrent encoder previously described in the present disclosure. For example, the bi-directional recurrent encoder manager 702 can train one or more aspects of the speech emotion recognition system 106 using the Interactive Emotional Dyadic Motion Capture dataset. Additionally, the bi-directional recurrent encoder manager 702 can handle the obtaining, receiving, generating, determining, and/or passing of vectors (e.g., input vectors, audio feature vectors, textual feature vectors, etc.) within the audio bi-directional recurrent encoder and text bi-directional recurrent encoder. Further, the bi-directional recurrent encoder manager 702 can handle transmission of data to and from the audio bi-directional recurrent encoder and text bi-directional recurrent encoder. For example, the bi-directional recurrent encoder manager 702 may receive a transcript including textual data 714 from an ASR system. In another example, the bi-directional recurrent encoder manager 702 may pass one or more feature vectors to the neural attention mechanism previously described in the present disclosure.

As mentioned, the speech emotion recognition system 106 includes the MHA manager 704. The MHA manager 704 can determine attention output using a neural attention mechanism previously described in the present disclosure. Additionally, the MHA manager 704 can handle the obtaining, receiving, generating, determining, and/or passing of vectors (e.g., audio feature vectors, textual feature vectors, attention output (vectors) for each state in the textual sequence, etc.). For example, the MHA manager 704 can handle receiving the audio feature vector from the audio bi-directional recurrent encoder and receiving the textual feature vector from the text bi-directional recurrent encoder. With the audio feature vector and the textual feature vector, the MHA manager 704 can handle generating attention output using the neural attention mechanism that intelligently blends together aspects of the audio feature vector and the textual feature vector. Further, for example, the MHA manager 704 can handle passing the attention output to the hidden feature vector generator 316 previously described in the present disclosure.

As mentioned, the speech emotion recognition system 106 includes the hidden feature vector generator 316. The hidden feature vector generator 316 can handle the obtaining, receiving, generating, determining, and/or passing of vectors (e.g., audio feature vectors, textual feature vectors, attention output (vectors) for each state in the textual sequence, hidden feature vectors, etc.). For example, based on the attention output received at the hidden feature vector generator 316, the hidden feature vector generator 316 can generate a hidden feature vector as previously described in the present disclosure. Further, the speech emotion recognition system 106 can pass the hidden feature vector to the speech emotion prediction generator 706.

The speech emotion prediction generator 706 can handle receiving hidden feature vectors passed from the hidden feature vector generator 316. For example, the speech emotion prediction generator 706 may direct the speech emotion probability engine 318 to generate a probability distribution among a plurality of candidate emotions that potentially correspond to the speech. In some embodiments, the speech emotion prediction generator 706 passes the hidden feature vector through a softmax function to determine the probability distribution. Based on the probabilities in the probability distribution, the speech emotion prediction generator 706 can select an emotion from the plurality of candidate emotions.

As further mentioned, the speech emotion recognition system 106 includes the data storage 710. The data storage 710 can handle data storage and can include audio data 712, textual data 714, and neural network training data 716. In these or other embodiments, the audio data 712 and the textual data 714 may be the same as or similar to the audio data 204, 304 and the text data 202, 302, respectively. Additionally, the neural network training data 716 can include one or more parameters that are learned and/or provided to the speech emotion recognition system 106. For example, the neural network training data 716 can include data relative to preferences, weights, biases, matrices, connections, artificial neurons, learning rates, gradients, emotions, or any other suitable data to perform the acts and algorithms of the present disclosure.

Each of the components 702-716 of the speech emotion recognition system 106 can include software, hardware, or both. For example, the components 702-716 can include one or more instructions stored on a computer-readable storage medium and executable by processors of one or more computing devices, such as a client device or server device. When executed by the one or more processors, the computer-executable instructions of the speech emotion recognition system 106 can cause the computing device(s) to perform the methods described herein. Alternatively, the components 702-716 can include hardware, such as a special-purpose processing device to perform a certain function or group of functions. Alternatively, the components 702-716 of the speech emotion recognition system 106 can include a combination of computer-executable instructions and hardware.

Furthermore, the components 702-716 of the speech emotion recognition system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-716 of the speech emotion recognition system 106 may be implemented as a stand-alone application, such as a desktop or mobile application. Furthermore, the components 702-716 of the speech emotion recognition system 106 may be implemented as one or more web-based applications hosted on a remote server. Alternatively, or additionally, the components 702-716 of the speech emotion recognition system 106 may be implemented in a suite of mobile device applications or "apps." For example, in one or more embodiments, the speech emotion recognition system 106 can comprise or operate in connection with digital software applications such as ADOBE® ANALYTICS CLOUD® or ADOBE® PREMIERE PRO®. Product names, including "ADOBE" and any other portion of one or more of the foregoing product names, may include registered trademarks or trademarks of Adobe Systems Incorporated in the United States and/or other countries.

FIGS. 1-7, the corresponding text, and the examples provide several different systems, methods, techniques, components, and/or devices of the speech emotion recognition system 106 in accordance with one or more embodiments. In addition to the above description, one or more embodiments can also be described in terms of flowcharts including acts for accomplishing a particular result. For example, FIG. 8 illustrates a flowchart of a series of acts 800 in accordance with one or more embodiments.

Figure 8:
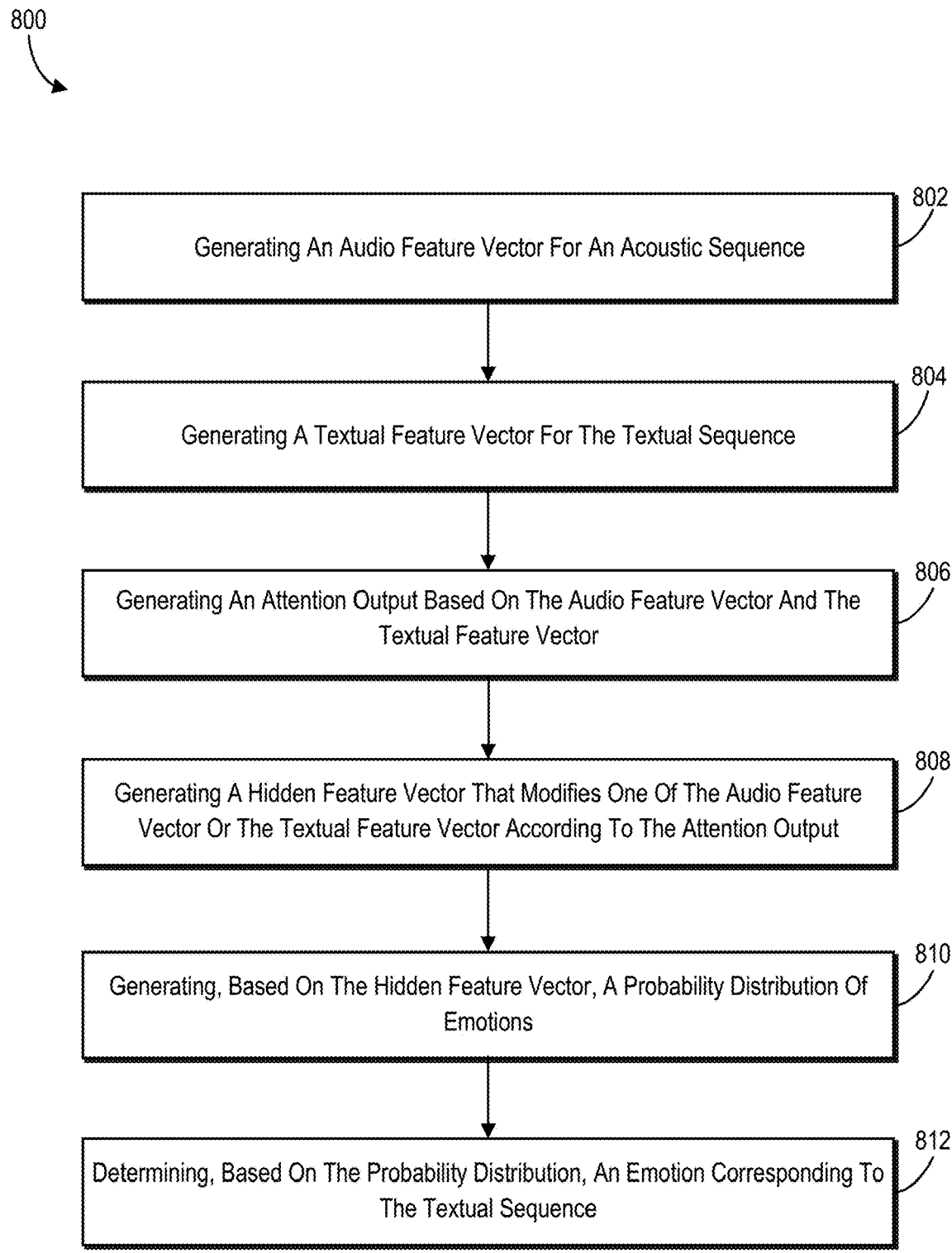
FIG. 8 illustrates a flowchart of a series of acts for generating a predicted emotion corresponding to speech in accordance with one or more embodiments.

As illustrated in FIG. 8, act 802 can involve generating an audio feature vector for an acoustic sequence. For example, act 802 can involve generating, by an audio bi-directional recurrent encoder, an audio feature vector comprising a representation of audio data feature information for one or more words in an acoustic sequence. In particular, act 802 can involve extracting MFCC features from an audio signal. More particularly, act 802 can further involve extracting prosodic features from the audio signal and concatenating the prosodic features to the MFCC features once the MFCC features have been processed by the audio bi-directional recurrent encoder.

Act 804 can involve generating a textual feature vector for the textual sequence. For example, act 804 can involve generating, by a textual bi-directional recurrent encoder, a textual feature vector comprising a representation of textual data feature information for the one or more words in a textual sequence corresponding to the acoustic sequence. For example, act 804 can involve tokenizing one or more words in a textual sequence into a sequence of tokens. Act 804 can also involve converting, using a word-embedding layer, the sequence of tokens to create a textual input vector for passing to the textual bi-directional recurrent encoder.

Act 806 can involve generating attention output based on the audio feature vector and the textual feature vector. For example, act 806 can involve generating, utilizing a neural attention mechanism, an attention output based on the audio feature vector and the textual feature vector.

Act 808 can involve generating a hidden feature vector that modifies one of the audio feature vector or the textual feature vector according to the attention output. In some embodiments, the hidden feature vector is a first hidden feature vector, and act 808 can involve generating additional hidden feature vectors (e.g., a second hidden feature vector, a third hidden feature vector, and so forth). Similarly, in some embodiments, the attention output is a first attention output, and act 808 can involve generating additional attention outputs like a second attention output, a third attention output, and so forth.

For example, at act 808 and/or an additional act in the series of acts 800, can involve, utilizing the neural attention mechanism, a second attention output based on the first hidden feature vector and another one of the audio feature vector or the textual feature vector not configured to be modified by the first attention output in the first hidden feature vector. A subsequent act can involve generating, based on the first hidden feature vector, a second hidden feature vector that modifies, according to the second attention output, the other one of the audio feature vector or the textual feature vector not configured to be modified by the first attention output in the first hidden feature vector. As a further example, act 808 and/or an additional act in the series of acts 800 can involve generating, utilizing the neural attention mechanism, a third attention output based on the second hidden feature vector and based on the audio feature vector or the textual feature vector configured to be modified by the first attention output in the first hidden feature vector. A subsequent act can involve generating, based on the second hidden feature vector, a third hidden feature vector that modifies, according to the third attention output, the audio feature vector or the textual feature vector configured to be modified by the first attention output in the first hidden feature vector.

Act 810 can involve generating, based on the hidden feature vector, a probability distribution of emotions. For example, act 810 can involve generating, based on the hidden feature vector, a probability distribution of emotions among a plurality of candidate emotions. For example, in some embodiments, the plurality of candidate emotions includes emotion categories of sad, happy, angry, and neutral. Additionally, in some embodiments, act 810 can involve generating the probability distribution of emotions among the plurality of candidate emotions by passing the hidden feature vector through a softmax function. Further, in some embodiments, the probability distribution is a first probability distribution, and act 810 can involve generating additional probability distributions like a second probability distribution of emotions, a third probability distribution of emotions, and so forth. For example, act 810 and/or an additional act in the series of acts 800 can involve generating based on the second hidden feature vector, a second probability distribution of emotions among the plurality of candidate emotions. As a further example, act 810 and/or an additional act in the series of acts 800 can involve generating, based on the third hidden feature vector, a third probability distribution of emotions among the plurality of candidate emotions.

Act 812 can involve determining, based on the probability distribution, an emotion corresponding to the textual sequence. For example, act 812 can involve determining, based on the probability distribution, an emotion of the plurality of candidate emotions corresponding to the one or more words in the textual sequence. In some embodiments, where the probability distribution is a first probability distribution, act 812 can involve determining, based on a second probability distribution, the emotion of the plurality of candidate emotions corresponding to the one or more words in the textual sequence. Additionally or alternatively, act 812 can involve determining, based on a third probability distribution, the emotion of the plurality of candidate emotions corresponding to the one or more words in the textual sequence. Still further act 812 can involve generating the probability distribution of emotions among the plurality of candidate emotions by passing the hidden feature vector through a SoftMax function.

It is understood that the outlined acts in the series of acts 800 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 8, an act in the series of acts 800 may include an act to obtain audio data comprising speech for transcribing into text form the one or more words in the textual sequence. For example, the speech emotion recognition system 106 may generate a transcription based on audio corresponding to the one or more words in the textual sequence. Additionally or alternatively, the speech emotion recognition system 106 may receive a transcription from an ASR system that bases the transcription on the audio corresponding to the one or more words in the textual sequence.

For example, in one or more embodiments, the series of acts can involve generating, by an audio bi-directional recurrent encoder, an audio feature vector comprising a representation of audio data feature information for one or more words in a textual sequence. The series of acts can also involve generating, by a textual bi-directional recurrent encoder, a textual feature vector comprising a representation of textual data feature information for the one or more words in the textual sequence. The series of acts can also involve generating, utilizing a neural attention mechanism, an attention output for each state of the textual sequence by combining corresponding values at each state for the textual feature vector with a context vector that includes a portion of the audio feature vector.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
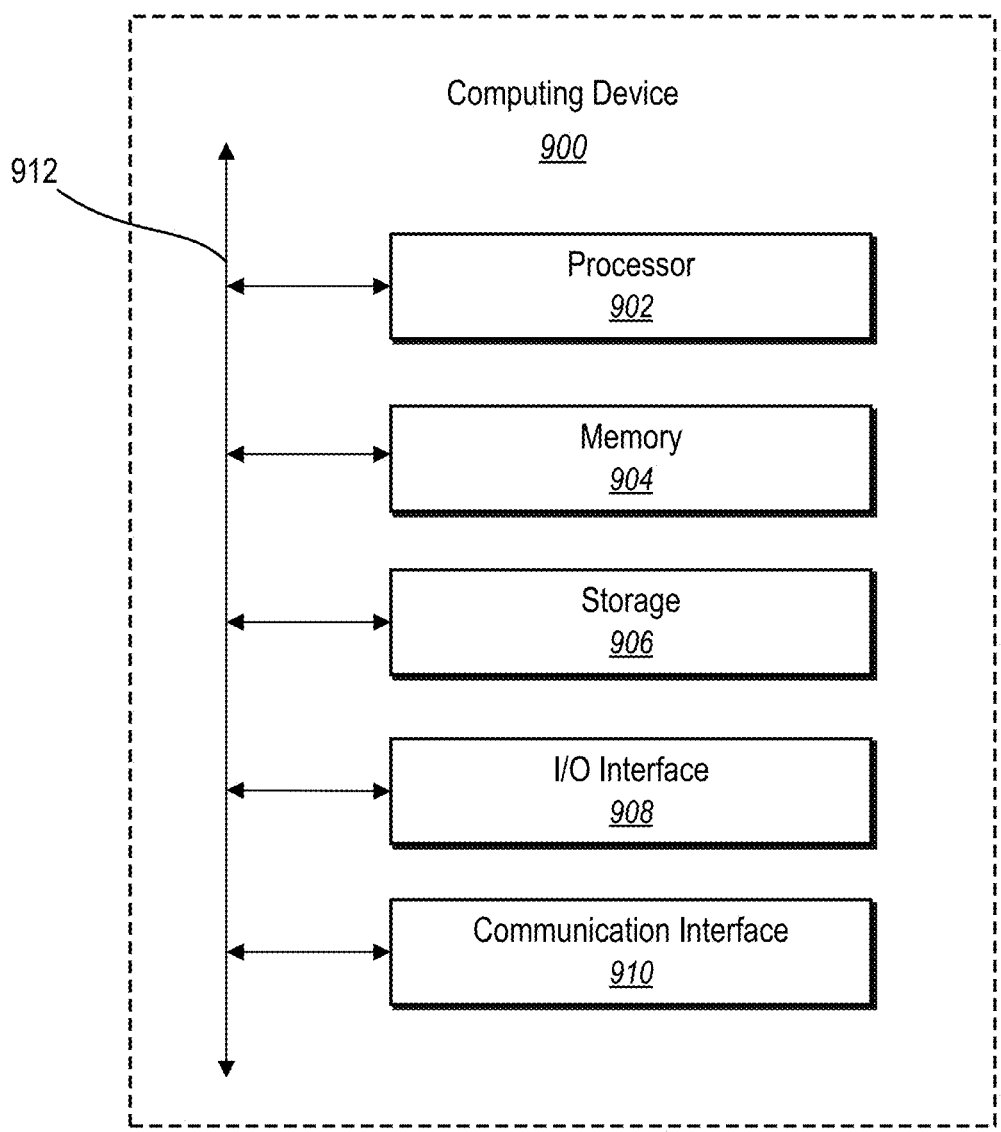
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the computing device 700, the server(s) 102, and the client devices 112). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of the computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   one or more memory devices comprising:
   an audio bi-directional recurrent encoder that generates an audio feature vector for one or more words in an acoustic sequence;
   a textual bi-directional recurrent encoder that generates a textual feature vector for the one or more words in a textual sequence corresponding to the acoustic sequence;
   a multi-hop neural attention model that generates an attention output at each hop that alternates from utilizing the textual feature vector and the audio feature vector as context; and
   a hidden feature vector generator that generates a hidden feature vector based on the attention output and one or more of the audio feature vector and the textual feature vector; and
   one or more processors configured to cause the system to determine an emotion of the acoustic sequence based on the hidden feature vector.

2. The system of claim 1, wherein the multi-hop neural attention model further comprises a first-hop attention model that generates a first attention output based on the audio feature vector at a final state of the acoustic sequence and the textual feature vector at each state of the textual sequence.

3. The system of claim 2, wherein the hidden feature vector generator generates the hidden feature vector as a first-hop hidden feature vector based on the textual feature vector at each state of the textual sequence and the first attention output.

4. The system of claim 1, wherein the multi-hop neural attention model further comprises a second-hop attention model that generates a second attention output based on the audio feature vector at each state of the acoustic sequence.

5. The system of claim 4, wherein the second-hop attention model generates the second attention output based on the hidden feature vector.

6. The system of claim 4, wherein the hidden feature vector generator generates an additional hidden feature vector as a second-hop hidden feature vector based on the second attention output and the audio feature vector at each state of the acoustic sequence.

7. The system of claim 6, wherein the multi-hop neural attention model further comprises a third-hop attention model that generates a third attention output based on the textual feature vector at each state of the textual sequence and the second-hop hidden feature vector.

8. The system of claim 7, wherein the hidden feature vector generator generates another hidden feature vector as a third-hop hidden feature vector based on the third attention output and the textual feature vector at each state of the textual sequence.

9. The system of claim 1, wherein the one or more processors are configured to cause the system to determine the emotion of the acoustic sequence based on two or more of a first-hop hidden feature vector, a second-hop hidden feature vector, or a third-hop feature vector.

10. A system comprising:
one or more memory devices comprising:
an audio encoder that generates an audio feature vector for one or more words in an acoustic sequence;
a textual encoder that generates a textual feature vector for the one or more words in a textual sequence corresponding to the acoustic sequence;
a first neural attention model that generates a first attention output by applying attention to the textual feature vector using the audio feature vector as context;
a first hidden feature vector generator that generates a first hidden feature vector based on the first attention output;
a second neural attention model that generates a second attention output by applying attention to the audio feature vector using the first hidden feature vector as context; and
a second hidden feature vector generator that generates a second hidden feature vector based on the second attention output and the audio feature vector; and
one or more processors configured to cause the system to determine an emotion of the acoustic sequence based on the first hidden feature vector and the second hidden feature vector.

11. The system of claim 10, wherein:
the first neural attention model generates the first attention output based on the audio feature vector at a final state of the acoustic sequence and the textual feature vector at each state of the textual sequence; and
the first hidden feature vector generator generates the first hidden feature vector based on first attention output and the textual feature vector at each state of the textual sequence.

12. The system of claim 10, wherein:
the second neural attention model generates the second attention output based on the audio feature vector at each state of the acoustic sequence; and
the second hidden feature vector generator generates the second hidden feature vector based on the audio feature vector at each state of the acoustic sequence.

13. The system of claim 10, wherein the one or more memory devices further comprise:
a third neural attention model that generates a third attention output based on the textual feature vector at each state of the textual sequence and the second hidden feature vector; and
a third hidden feature vector generator that generates a third hidden feature vector based on the third attention output and the textual feature vector at each state of the textual sequence.

14. The system of claim 13, wherein the one or more processors are configured to cause the system to determine the emotion of the acoustic sequence based on the third hidden feature vector.

15. The system of claim 10, wherein:
the audio encoder comprises a bi-directional recurrent encoder; and
the textual encoder comprises a bi-directional recurrent encoder.

16. A non-transitory computer-readable medium storing instructions that, when executed by at least one processor, cause a computing device to:
generate, utilizing an audio bi-directional recurrent encoder, an audio feature vector for one or more words in an acoustic sequence;
generate, utilizing a textual bi-directional recurrent encoder, a textual feature vector for the one or more words in a textual sequence corresponding to the acoustic sequence;
generate, utilizing a neural attention model, an attention output by applying attention to the audio feature vector using the textual feature vector as a context vector;
generate, utilizing a hidden feature vector generator, a hidden feature vector based on the attention output and the audio feature vector; and
determine an emotion of the acoustic sequence based on the hidden feature vector.

17. The non-transitory computer-readable medium of claim 16, further comprising instructions that, when executed by the at least one processor, cause the computing device to generate, utilizing the neural attention model, an additional attention output by applying attention to the textual feature vector using the audio feature vector as a context vector.

18. The non-transitory computer-readable medium of claim 17, further comprising instructions that, when executed by the at least one processor, cause the computing device to generate, utilizing the hidden feature vector generator, an additional hidden feature vector based on the additional attention output and the textual feature vector.

19. The non-transitory computer-readable medium of claim 18, further comprising instructions that, when executed by the at least one processor, cause the computing device to determine the emotion of the acoustic sequence based on the additional hidden feature vector, the emotion corresponding to an emotion category of sad, happy, angry, or neutral.

20. The non-transitory computer-readable medium of claim 16, further comprising instructions that, when executed by the at least one processor, cause the computing device to generate a transcription of the acoustic sequence including the one or more words in the textual sequence.

* * * * *